(12) United States Patent
Li et al.

(10) Patent No.: US 12,140,537 B2
(45) Date of Patent: Nov. 12, 2024

(54) TERAHERTZ SENSING SYSTEM AND TERAHERTZ SENSING ARRAY

(71) Applicant: HUAWEI TECHNOLOGIES CO., LTD., Guangdong (CN)

(72) Inventors: Oupeng Li, Chengdu (CN); Yinggang Du, Shenzhen (CN)

(73) Assignee: Huawei Technologies Co., Ltd., Shenzhen (CN)

( * ) Notice: Subject to any disclaimer, the term of this patent is extended or adjusted under 35 U.S.C. 154(b) by 112 days.

(21) Appl. No.: 17/843,572

(22) Filed: Jun. 17, 2022

(65) Prior Publication Data

US 2022/0317038 A1 Oct. 6, 2022

Related U.S. Application Data

(63) Continuation of application No. PCT/CN2020/137734, filed on Dec. 18, 2020.

(30) Foreign Application Priority Data

Dec. 19, 2019 (CN) .......................... 201911321095.6

(51) Int. Cl.
*G01N 21/3581* (2014.01)
(52) U.S. Cl.
CPC ................ *G01N 21/3581* (2013.01)
(58) Field of Classification Search
None
See application file for complete search history.

(56) References Cited

U.S. PATENT DOCUMENTS

| | | | | |
|---|---|---|---|---|
| 6,341,249 B1* | 1/2002 | Xing | ...................... | B64G 1/369 |
| | | | | 701/13 |
| 8,148,762 B2* | 4/2012 | Joe | ................... | H01L 31/02165 |
| | | | | 257/292 |
| 8,535,616 B2* | 9/2013 | Blair | ...................... | B82Y 20/00 |
| | | | | 250/201.3 |

(Continued)

FOREIGN PATENT DOCUMENTS

| | | |
|---|---|---|
| CN | 1445529 A | 10/2003 |
| CN | 103575407 A | 2/2014 |

(Continued)

OTHER PUBLICATIONS

Li-Min Xu, Wen-Hui Fan, and Jia Liu, "High-resolution reconstruction for terahertz imaging," Appl. Opt. 53, 7891-7897 (2014) (Year: 2014).*

(Continued)

*Primary Examiner* — Marcus H Taningco
*Assistant Examiner* — Djura Malevic
(74) *Attorney, Agent, or Firm* — Fish & Richardson P.C.

(57) ABSTRACT

A terahertz sensing system and a terahertz sensing array are provided. The terahertz sensing array includes N sensing unit groups arranged in an array form, and each of the N sensing unit groups includes M reconfigurable sensing units. Each of the M reconfigurable sensing units can detect one type of terahertz wave physical characteristic parameter, and the type of the terahertz wave physical characteristic parameter that can be detected by the reconfigurable sensing unit may vary based on a detection configuration, where N and M are positive integers greater than 1.

14 Claims, 24 Drawing Sheets

(56) References Cited

U.S. PATENT DOCUMENTS

| | | | | |
|---|---|---|---|---|
| 8,569,855 B2* | 10/2013 | Yokogawa | ............ | H04N 25/702 257/432 |
| 8,712,321 B1* | 4/2014 | Dankberg | ............ | H04B 7/2041 455/12.1 |
| 8,847,345 B2* | 9/2014 | Handa | .................... | G02B 5/204 257/292 |
| 9,006,661 B1* | 4/2015 | Newman | ............... | G01J 5/0837 250/349 |
| 9,234,797 B1* | 1/2016 | Newman | ............... | G01J 5/0837 |
| 9,494,464 B2* | 11/2016 | Kotter | ............... | G01N 21/3581 |
| 9,638,844 B2* | 5/2017 | Girard Desprolet | ... | G02B 5/008 |
| 9,841,506 B2* | 12/2017 | Brosius | ................ | G01S 5/0036 |
| 10,244,453 B2* | 3/2019 | Ashrafi | ................ | H04B 17/336 |
| 10,408,750 B2* | 9/2019 | Kondo | ................... | G01N 21/01 |
| 10,520,365 B2* | 12/2019 | Favero | ...................... | G01J 3/28 |
| 10,673,527 B2* | 6/2020 | Laurent | ............. | H04B 7/18513 |
| 11,041,787 B2* | 6/2021 | Kawara | ................. | B01D 29/56 |
| 11,237,103 B2* | 2/2022 | Blanchard | ........... | G01R 31/308 |
| 11,525,910 B2* | 12/2022 | Fox | ......................... | G01S 7/025 |
| 11,754,703 B2* | 9/2023 | Fox | ......................... | G01S 7/003 342/25 A |
| 11,941,781 B2* | 3/2024 | Kang | ..................... | G06N 20/00 |
| 2001/0048672 A1* | 12/2001 | Okunishi | ............... | H04H 20/74 370/316 |
| 2004/0155193 A1* | 8/2004 | Tran | .................... | G01N 21/3581 250/341.1 |
| 2006/0273245 A1* | 12/2006 | Kim | ....................... | B82Y 20/00 250/226 |
| 2008/0179526 A1* | 7/2008 | Xu | ............................ | G01J 3/42 250/341.7 |
| 2009/0008735 A1* | 1/2009 | Ogino | ............... | H01L 27/14601 257/436 |
| 2010/0025586 A1* | 2/2010 | Ogawa | ............... | G01N 21/3581 250/341.1 |
| 2011/0062333 A1* | 3/2011 | Ben-Bassat | ............. | H01L 31/09 257/443 |
| 2011/0115793 A1* | 5/2011 | Grycewicz | ............ | H04N 25/48 345/428 |
| 2011/0128405 A1* | 6/2011 | Handa | .................... | G02B 5/204 348/222.1 |
| 2012/0153148 A1* | 6/2012 | Federici | ................ | H01L 27/146 250/332 |
| 2013/0082345 A1 | 4/2013 | Corcos et al. | | |
| 2013/0189592 A1* | 7/2013 | Roumi | ................ | H01M 8/0247 429/405 |
| 2013/0221209 A1* | 8/2013 | Kamba | ............... | G01N 21/3581 250/225 |
| 2014/0030894 A1* | 1/2014 | Shin | ....................... | H01L 21/308 430/5 |
| 2014/0091409 A1* | 4/2014 | Murarka | ............... | B81B 3/0021 257/419 |
| 2014/0231648 A1* | 8/2014 | Kotter | .................... | G01V 8/005 250/339.02 |
| 2014/0252235 A1* | 9/2014 | Kondo | ................. | G01N 21/253 250/341.1 |
| 2015/0103802 A1* | 4/2015 | Cheng | ................. | H04W 72/541 370/330 |
| 2015/0136989 A1* | 5/2015 | Kondo | ................... | G01N 21/01 250/341.1 |
| 2016/0011104 A1* | 1/2016 | Kondo | ................... | G01N 21/01 250/453.11 |
| 2016/0036122 A1* | 2/2016 | Debray | .................... | H01Q 7/00 216/13 |
| 2017/0017018 A1* | 1/2017 | Chao | ..................... | G02B 3/0018 |
| 2021/0018362 A1* | 1/2021 | Sherry | .................... | G01J 3/108 |
| 2022/0065777 A1* | 3/2022 | Ma | ...................... | H01L 27/1443 |
| 2022/0082436 A1* | 3/2022 | Weale | ............... | H01L 31/03044 |
| 2022/0317038 A1* | 10/2022 | Li | ............................. | G01V 8/005 |

FOREIGN PATENT DOCUMENTS

| | | |
|---|---|---|
| CN | 104048761 A | 9/2014 |
| CN | 205038150 U | 2/2016 |
| CN | 105509880 A | 4/2016 |
| CN | 109471195 A | 3/2019 |
| CN | 109655841 A | 4/2019 |
| CN | 109655931 A | 4/2019 |
| CN | 109696299 A | 4/2019 |
| CN | 109856695 A | 6/2019 |
| CN | 209784559 U | 12/2019 |

OTHER PUBLICATIONS

Wang et al.l., Multi-feature enhancement for terahertz imaging; Electronics Letters Jul. 25, 2019 vol. 55 No. 15 pp. 847-849 (Year: 2019).*

Yang et al., Super-Resolution Reconstruction of Cell Pseudo-Color Image Based on Raman Technology; Sensors 2019, 19, 4076 (Year: 2019).*

Zhu et al., "Fast Imaging Technology of Terahertz Wave Based on Spatial Modulator," Journal of Terahertz Science and Electronic Information Technology, Jun. 2020, 7 pages (English Abstract).

Xu, "High Resolution Terahertz Image Processing," Xi'an Institute of Optics and Precision Machinery Graduate School of Chinese Academy of Sciences, May 2013, 11 pages (with translation of related part).

Office Action in Chinese Appln. No. 201911321095.6, dated Dec. 22, 2021, 27 pages (with English translation).

International Search Report and Written Opinion in International Appln. No. PCT/CN2020/137734, mailed on Feb. 25, 2021, 16 pages (with English translation).

Wu et al., "Programmable terahertz chip-scale sensing interface with direct digital reconfiguration at sub-wavelength scales," Nature Communications, Jun. 20, 2019, 13 pages.

Jozani et al., "Multi-bias, graphene-based reconfigurable THz absorber/reflector," Optik, vol. 198, Dec. 2019, 10 pages.

Luo et al., "Graphene-Based Multi-Beam Reconfigurable THz Antennas," IEEE Access, Mar. 6, 2019, 7 pages.

Vegesna et al., "Terahertz frequency selective surface with reconfigurable polarization characteristics using vanadium dioxide," Journal of Electromagnetic Waves and Applications, Nov. 5, 2013, 9 pages.

Extended European Search Report in European Appln No. 20902300.1, dated Mar. 21, 2023, 10 pages.

* cited by examiner

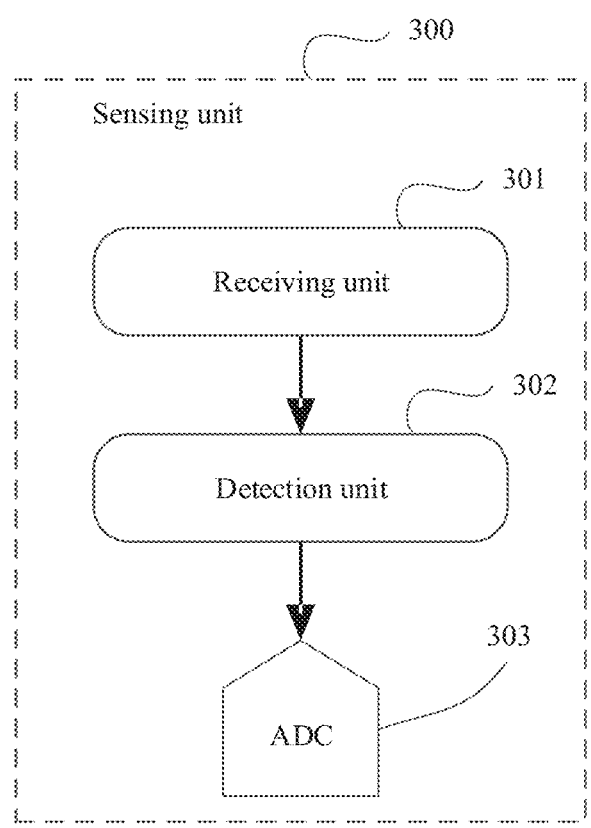
FIG. 3-A

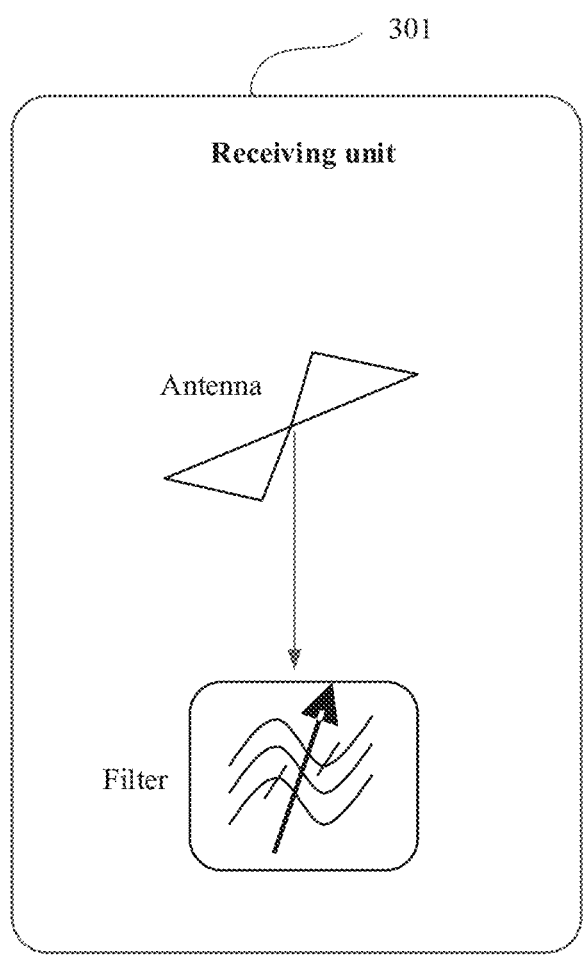
FIG. 3-B

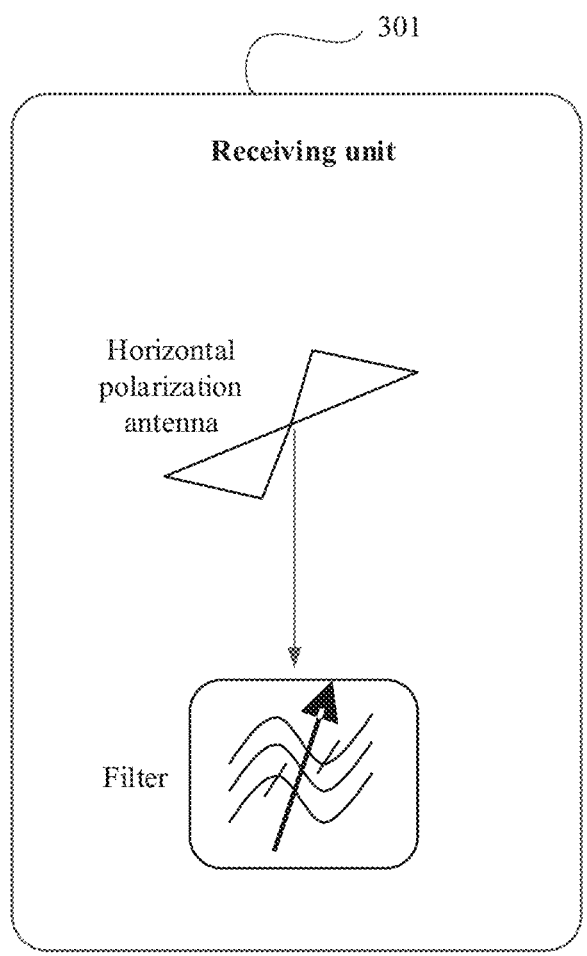
FIG. 3-C

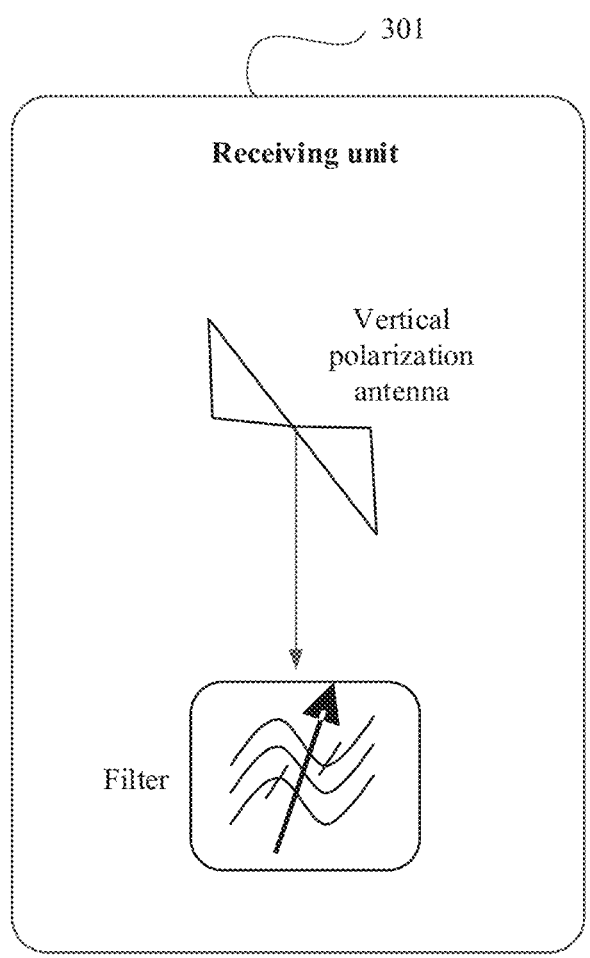
FIG. 3-D

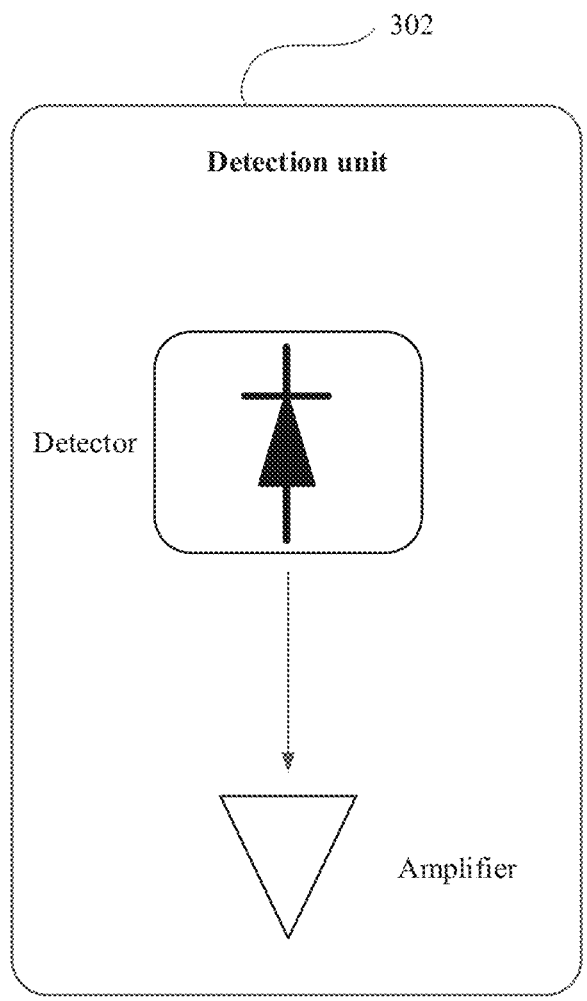
FIG. 3-E

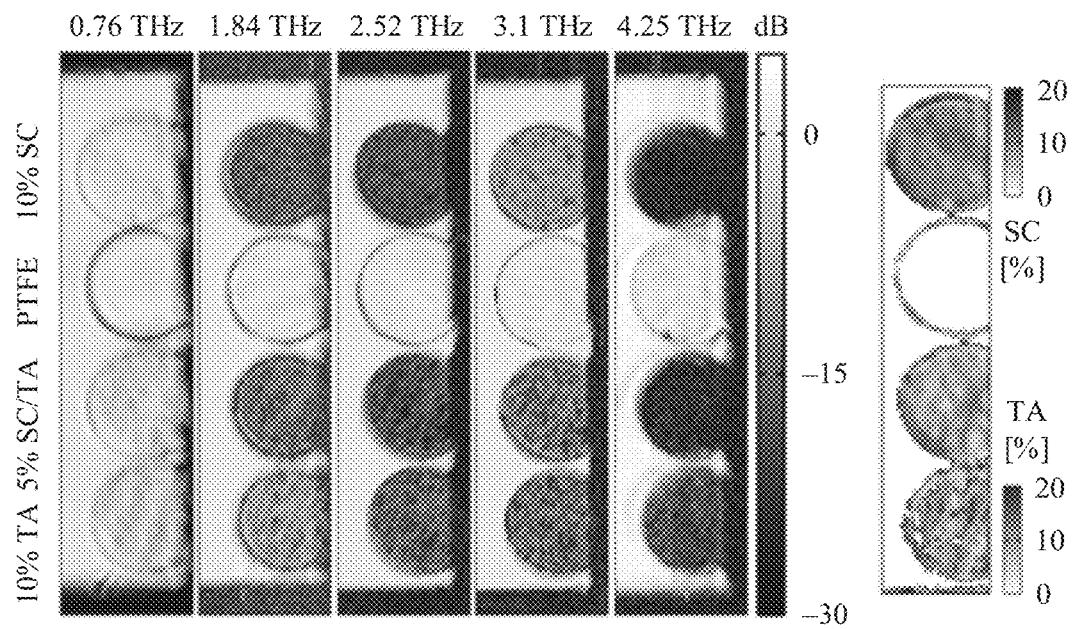
FIG. 4(a)　　　　　　　　FIG. 4(b)
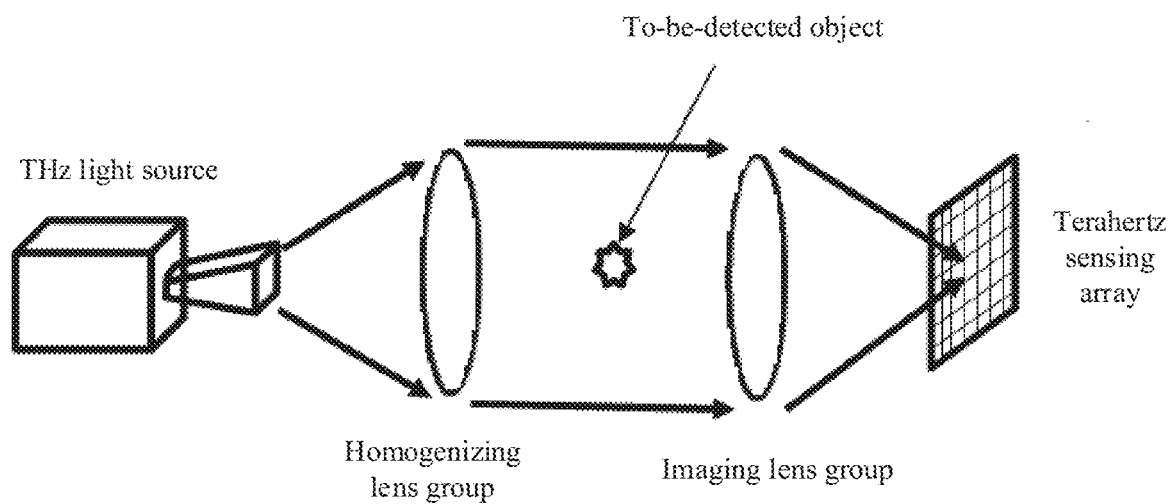
FIG. 5-A

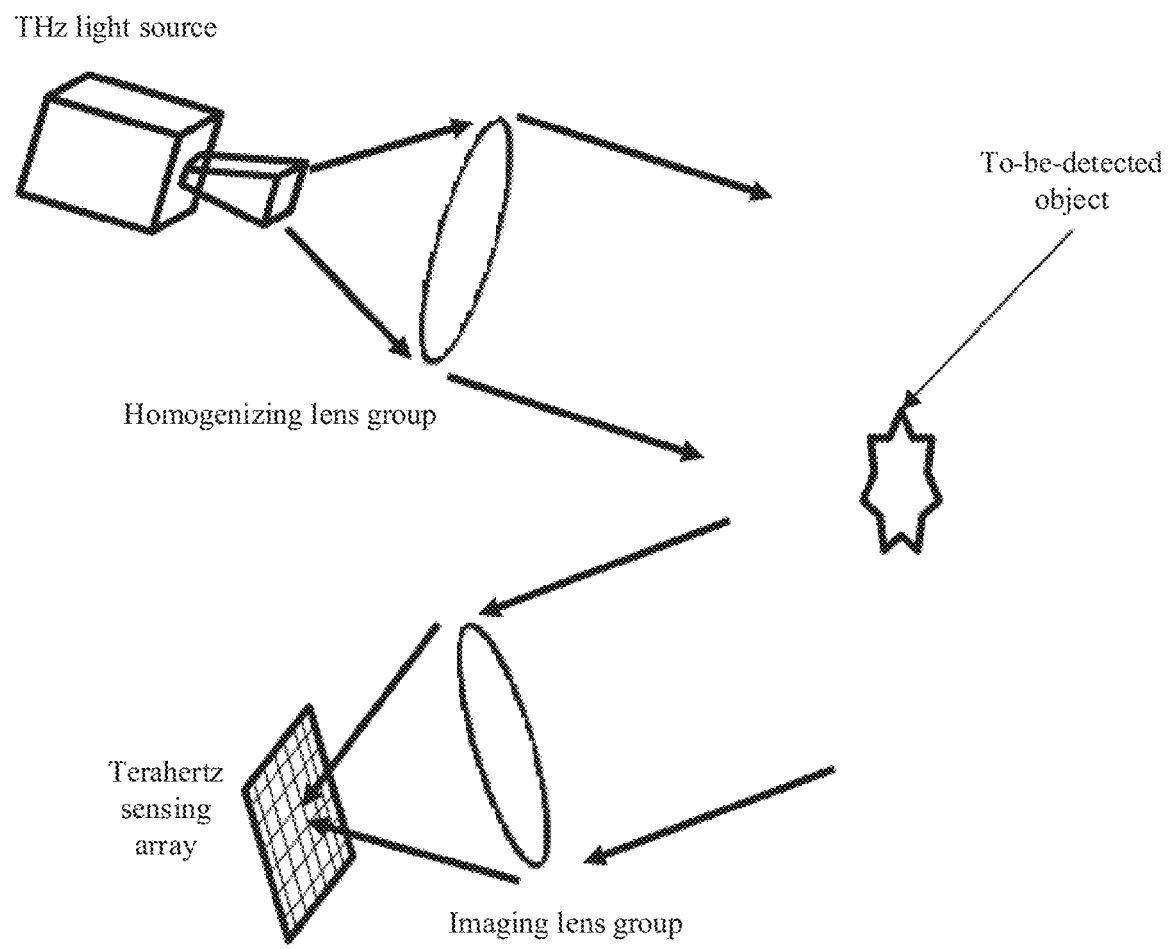
FIG. 5-B

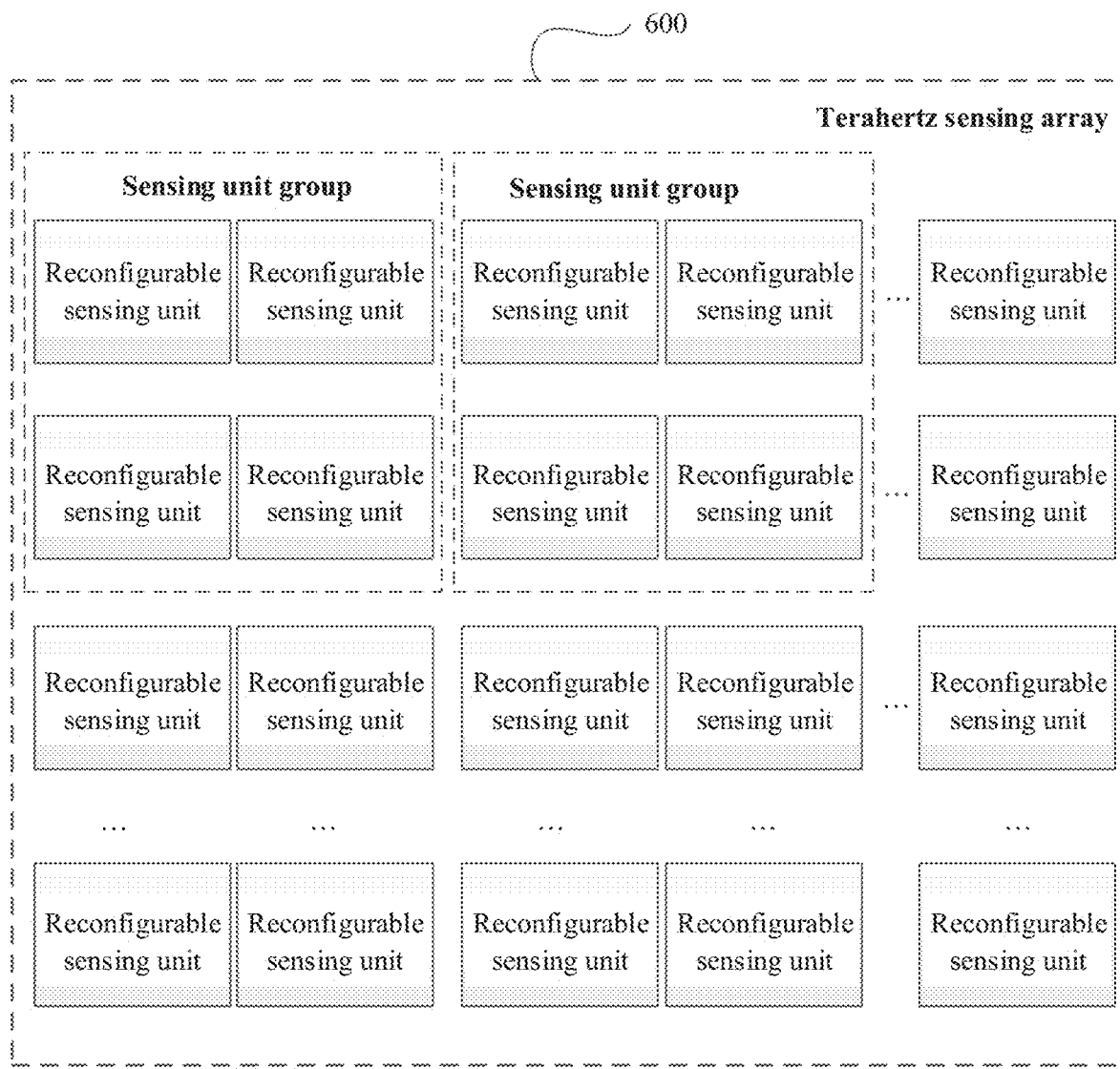
FIG. 6-A

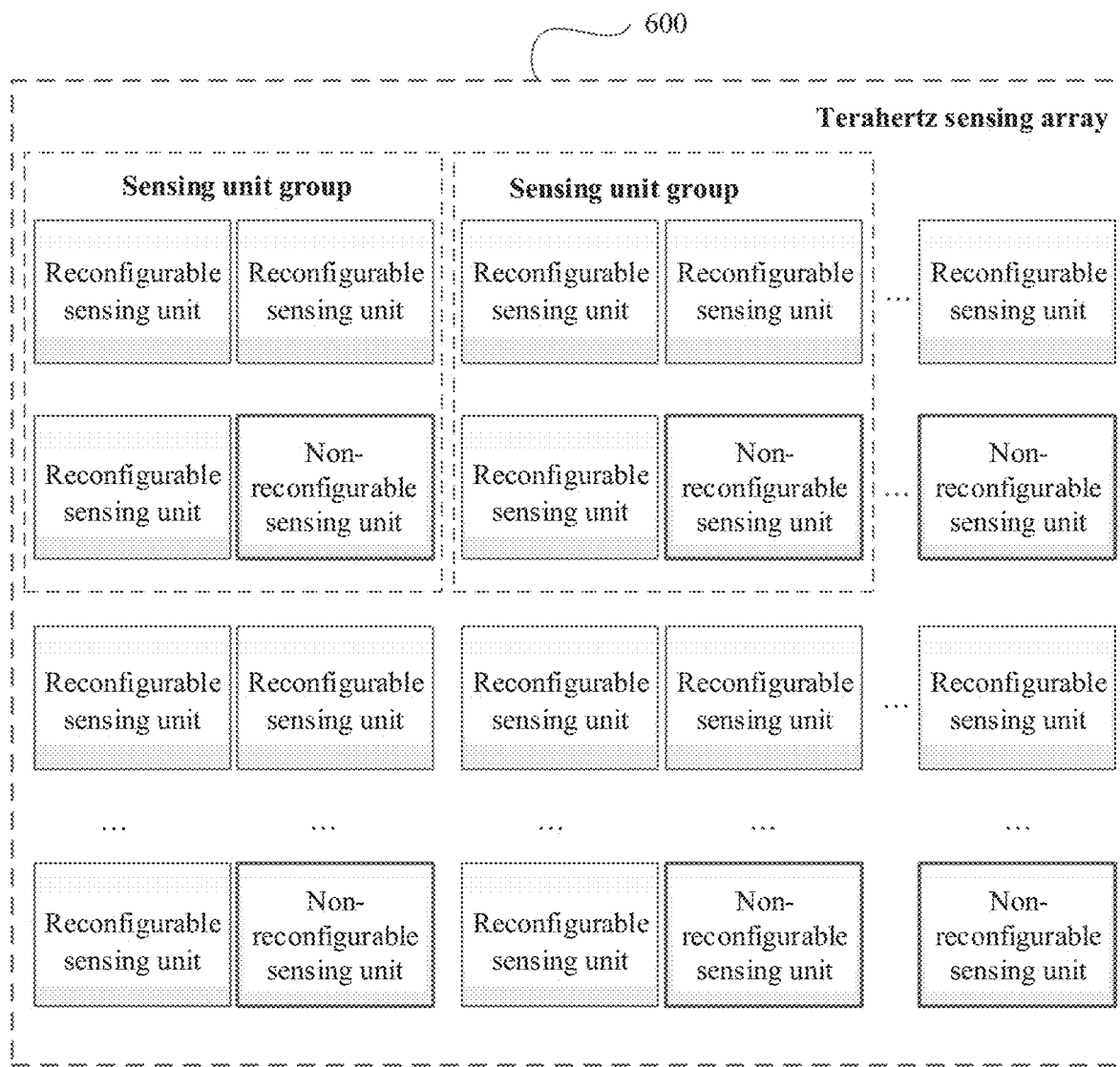
FIG. 6-B

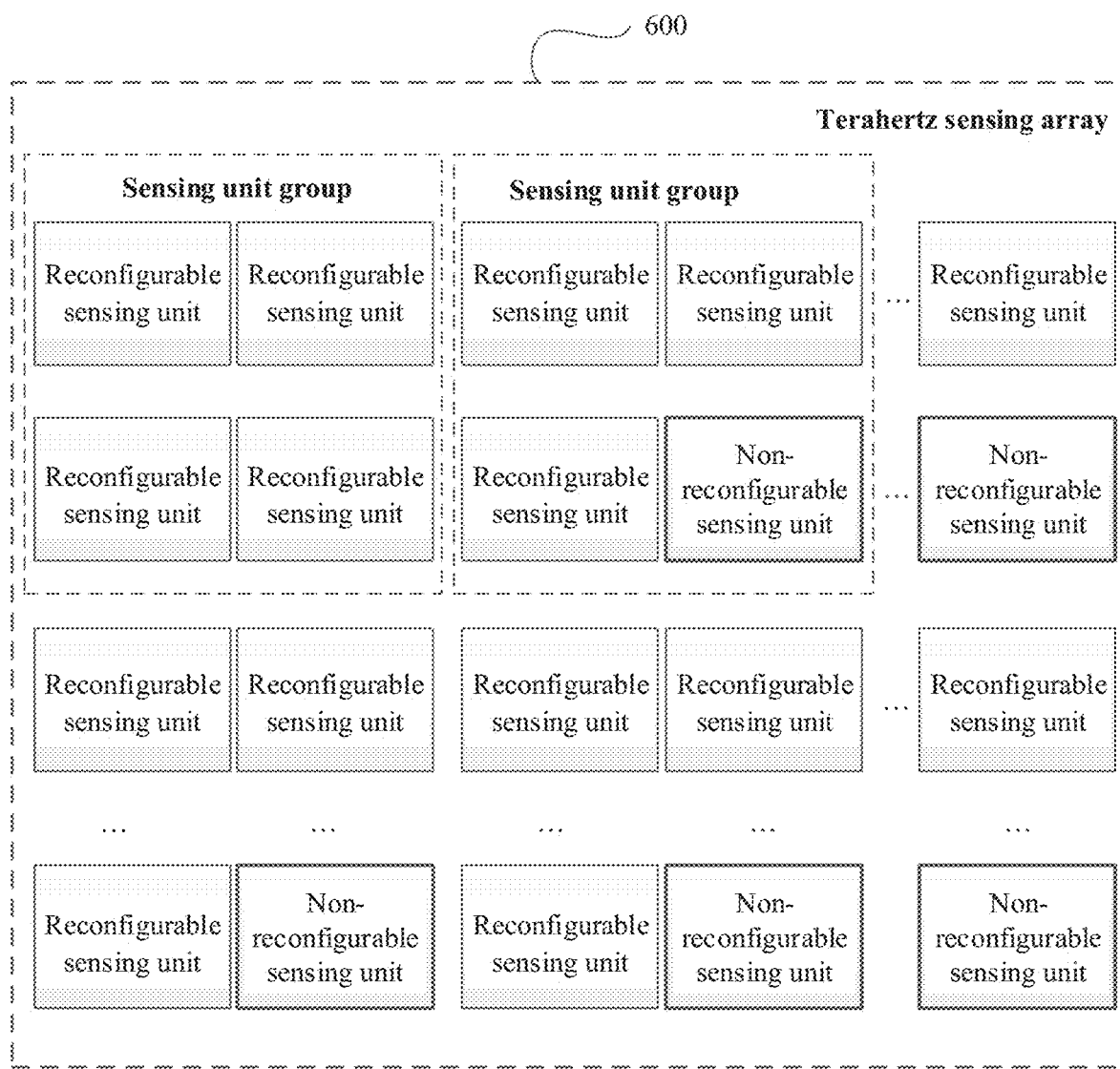
FIG. 6-C

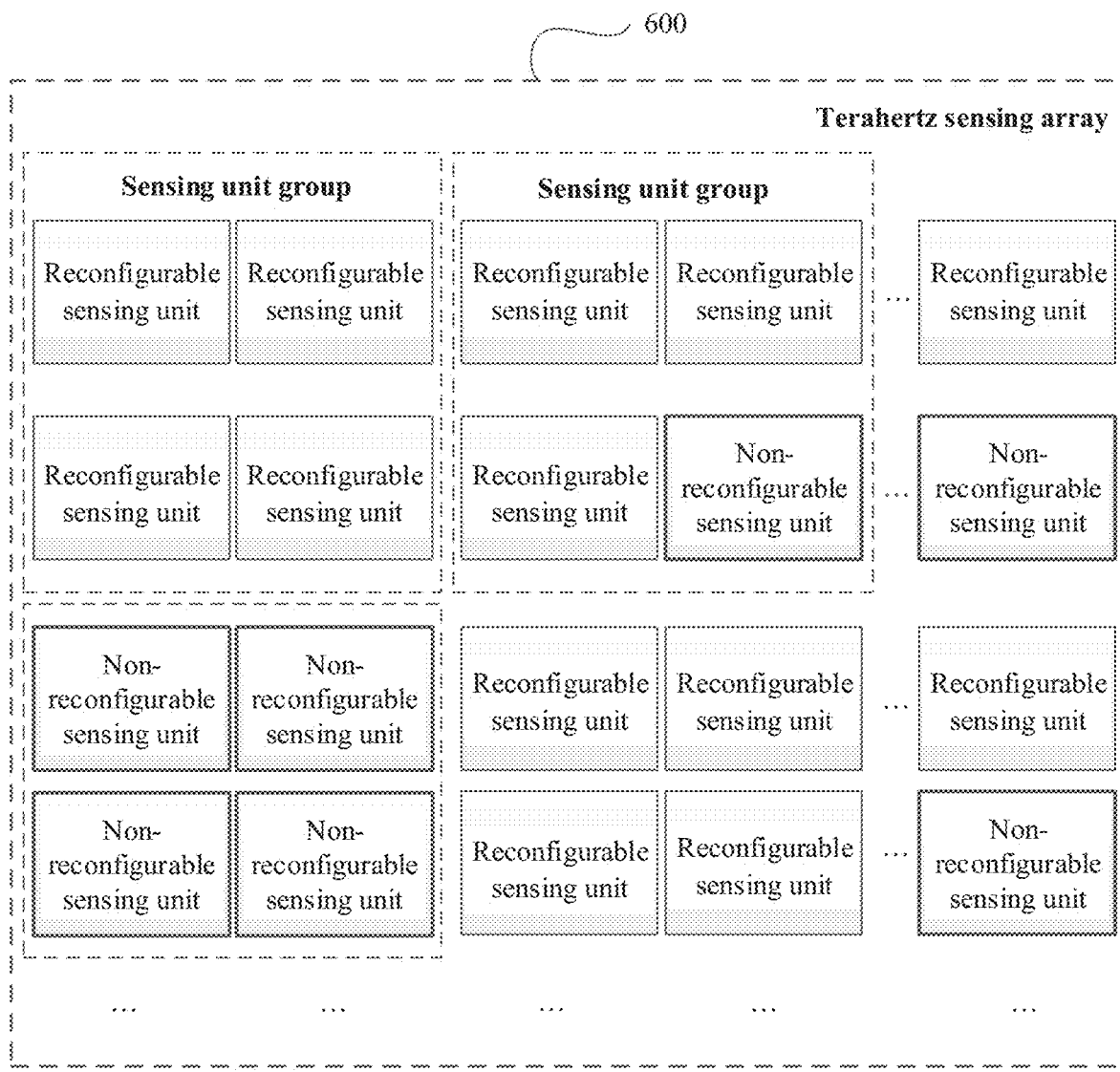
FIG. 6-D

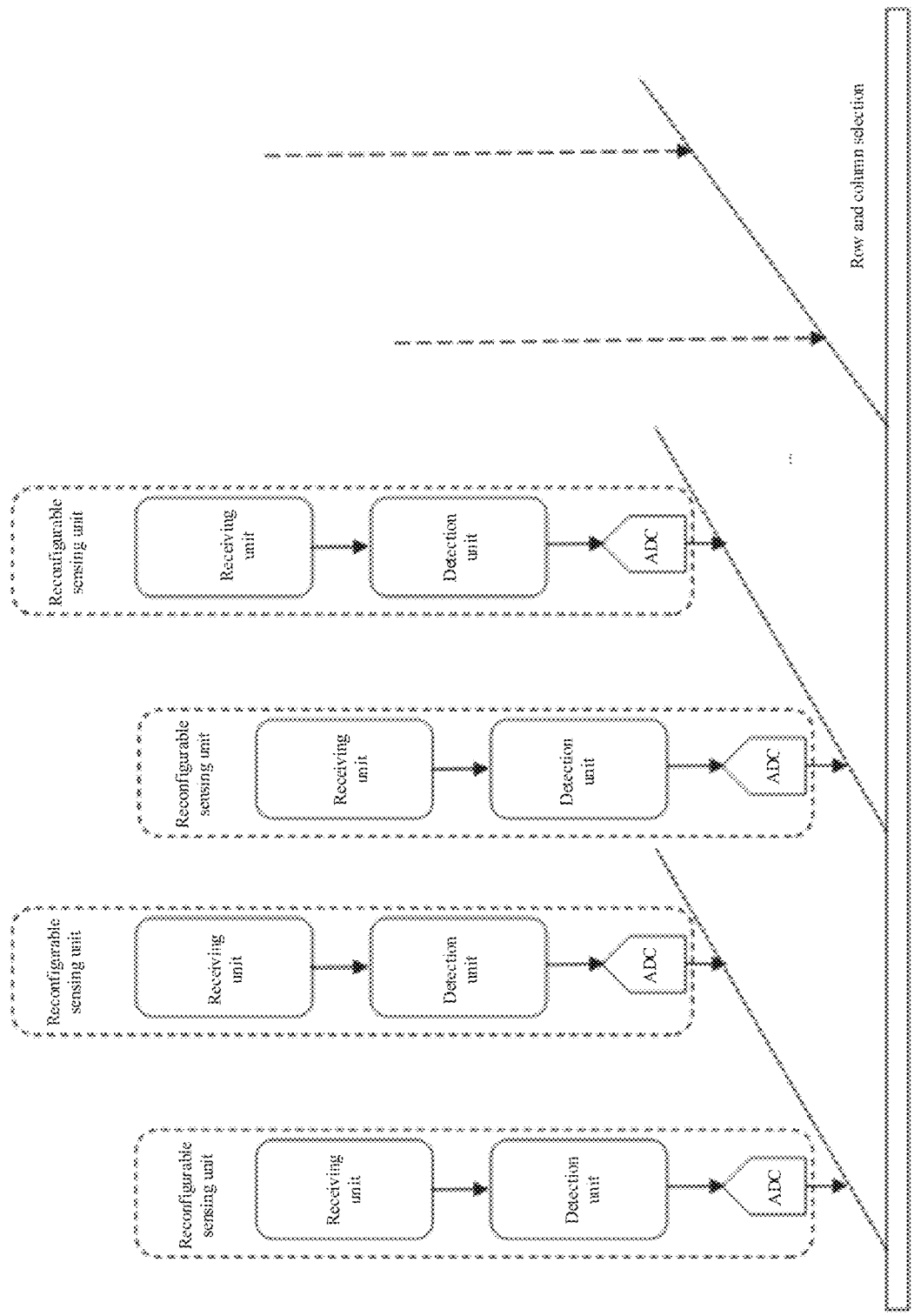
FIG. 6-E

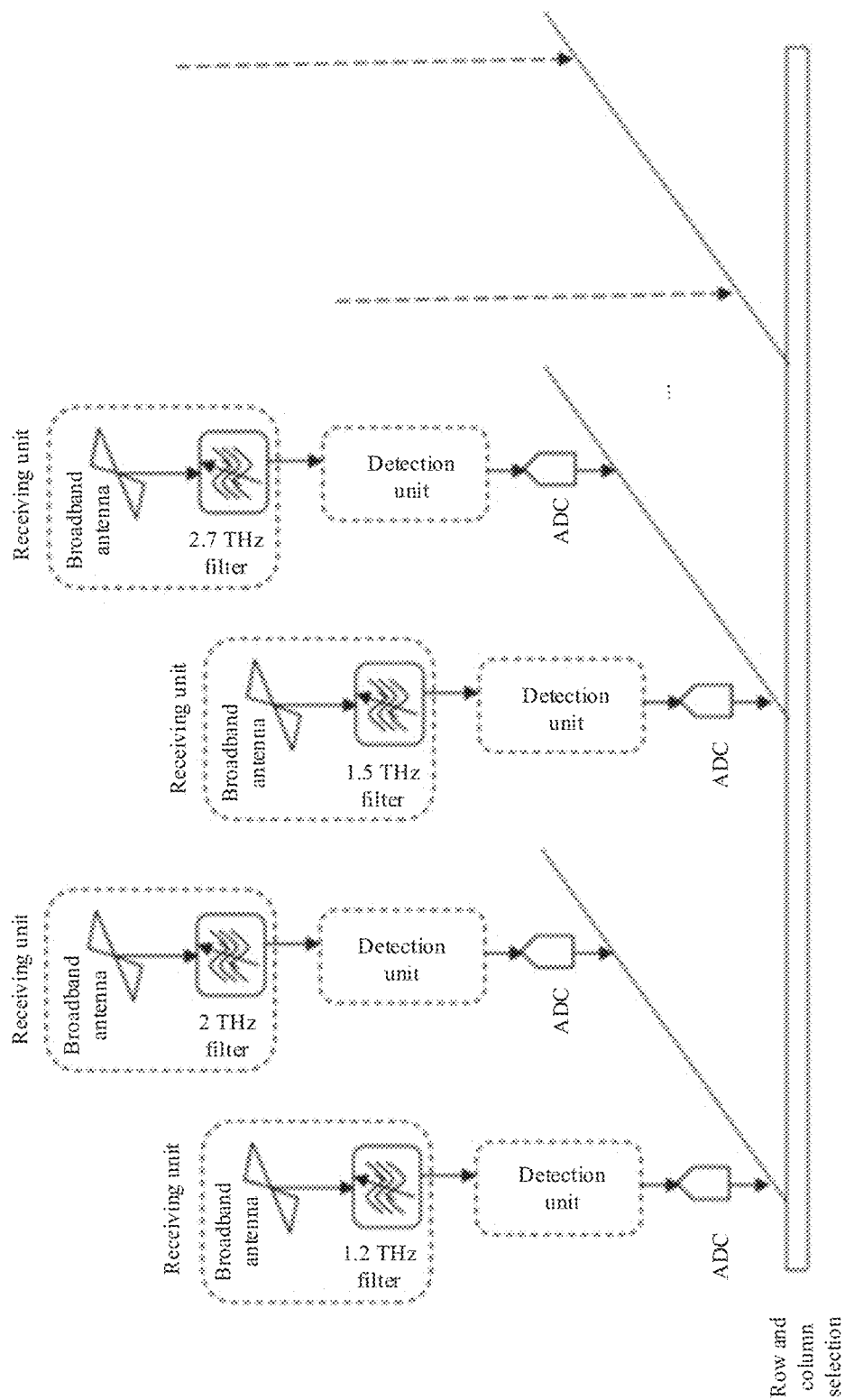
FIG. 8-A

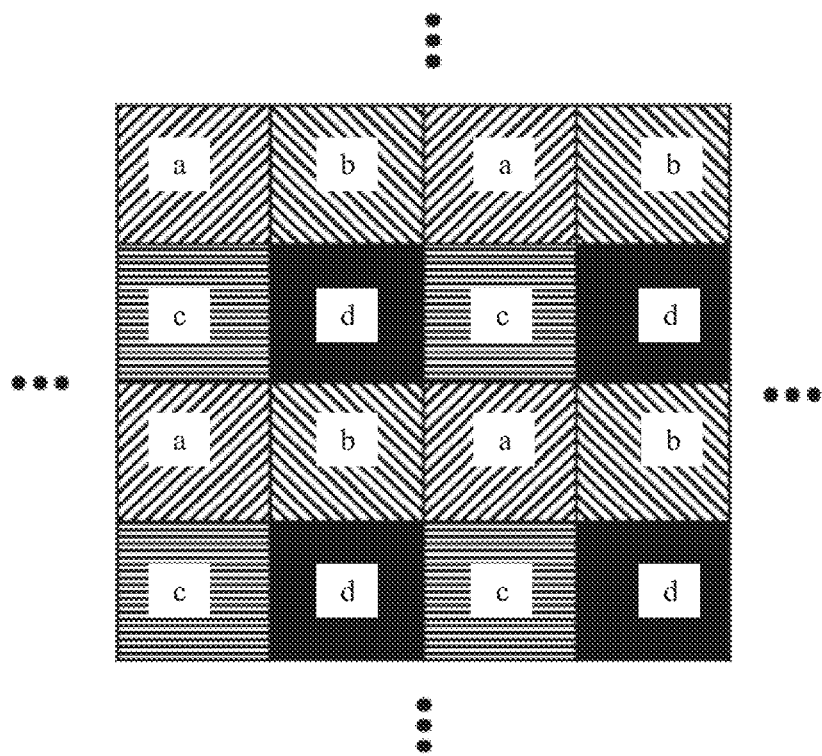
FIG. 8-B

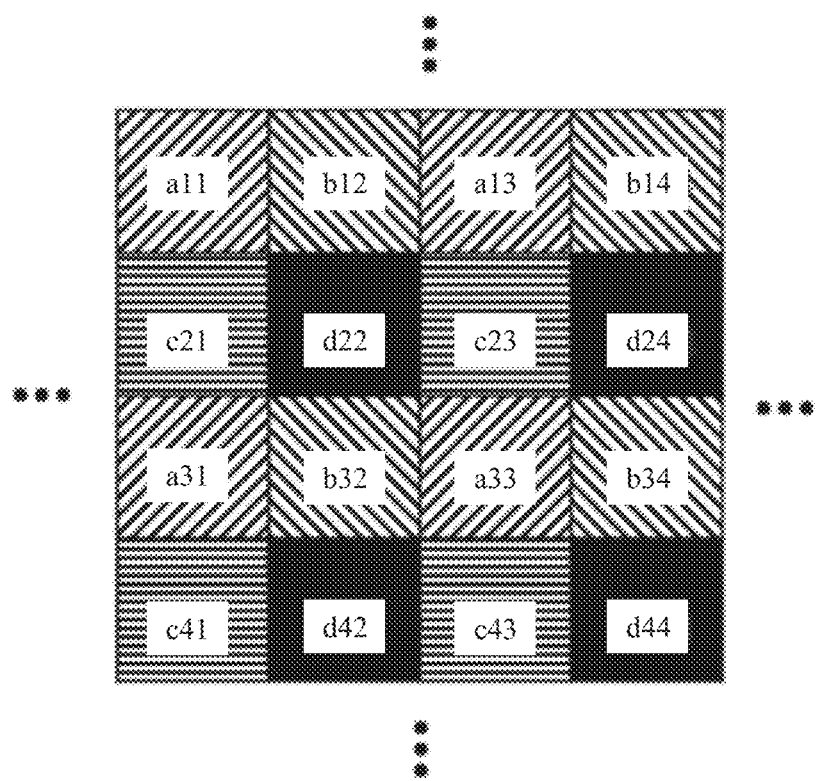
FIG. 8-C

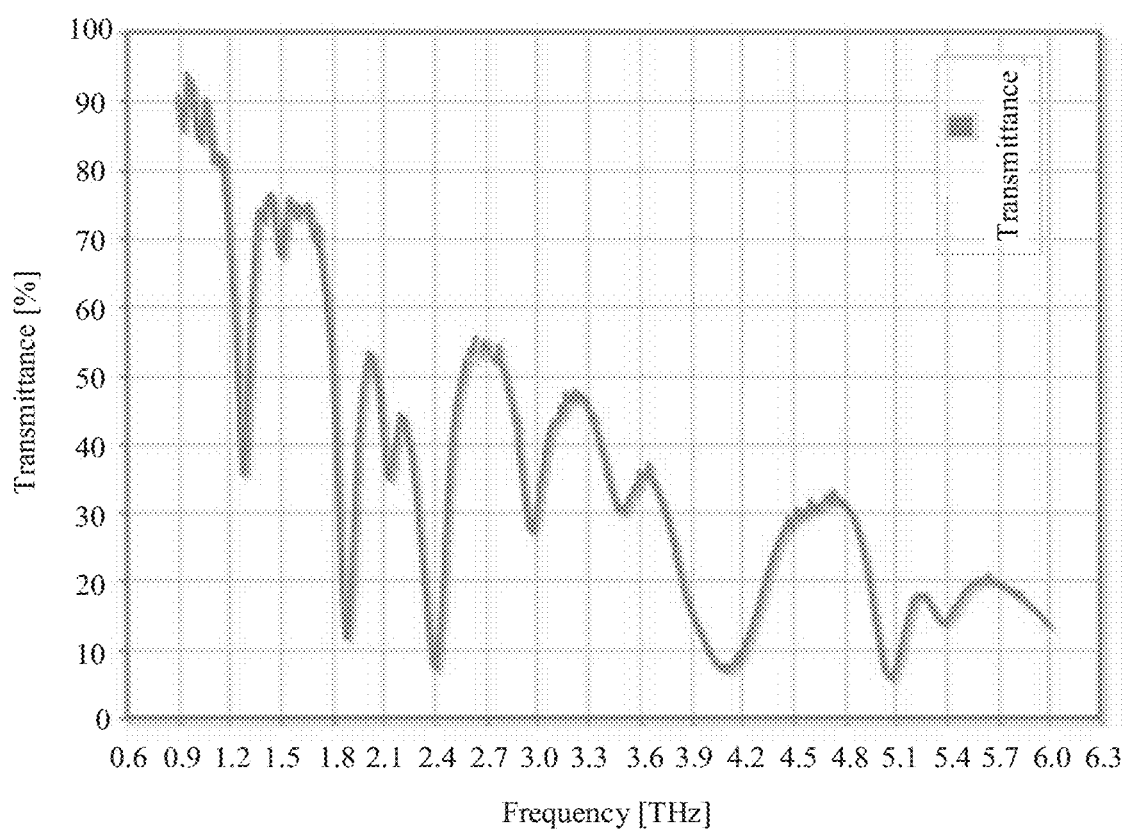
FIG. 8-D

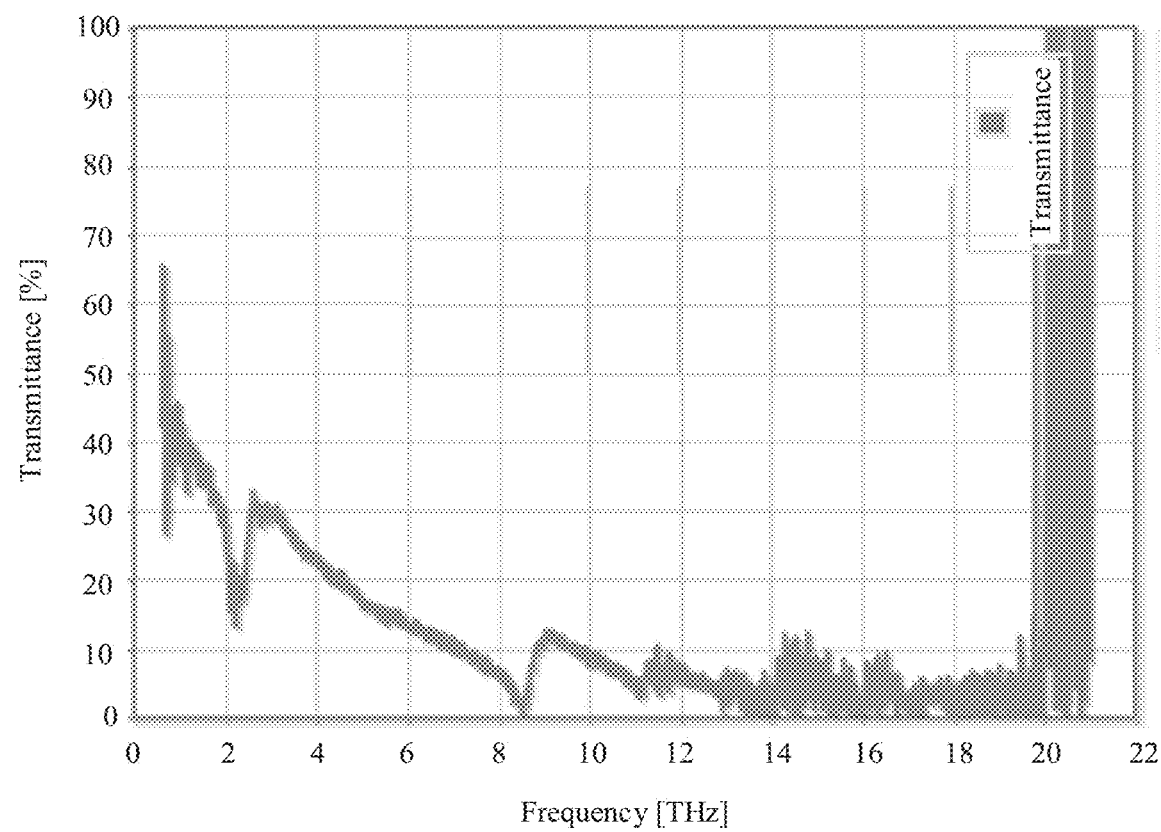
FIG. 8-E

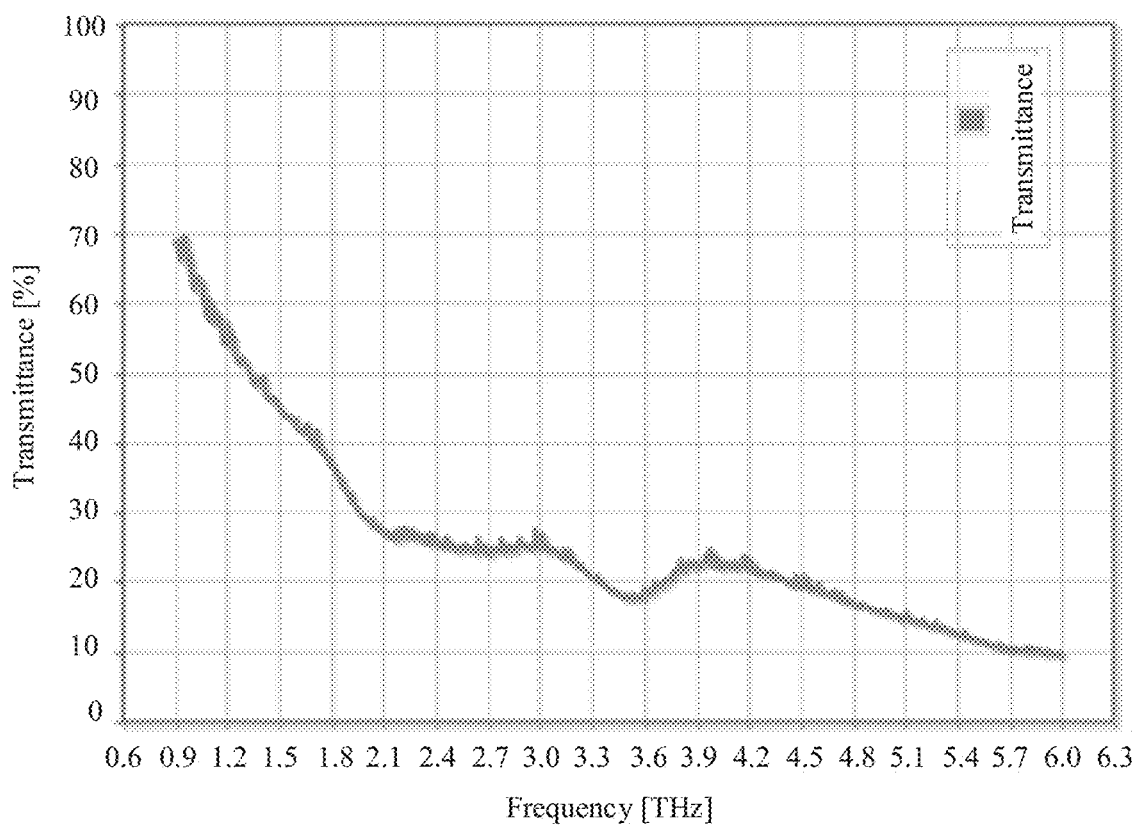
FIG. 8-F

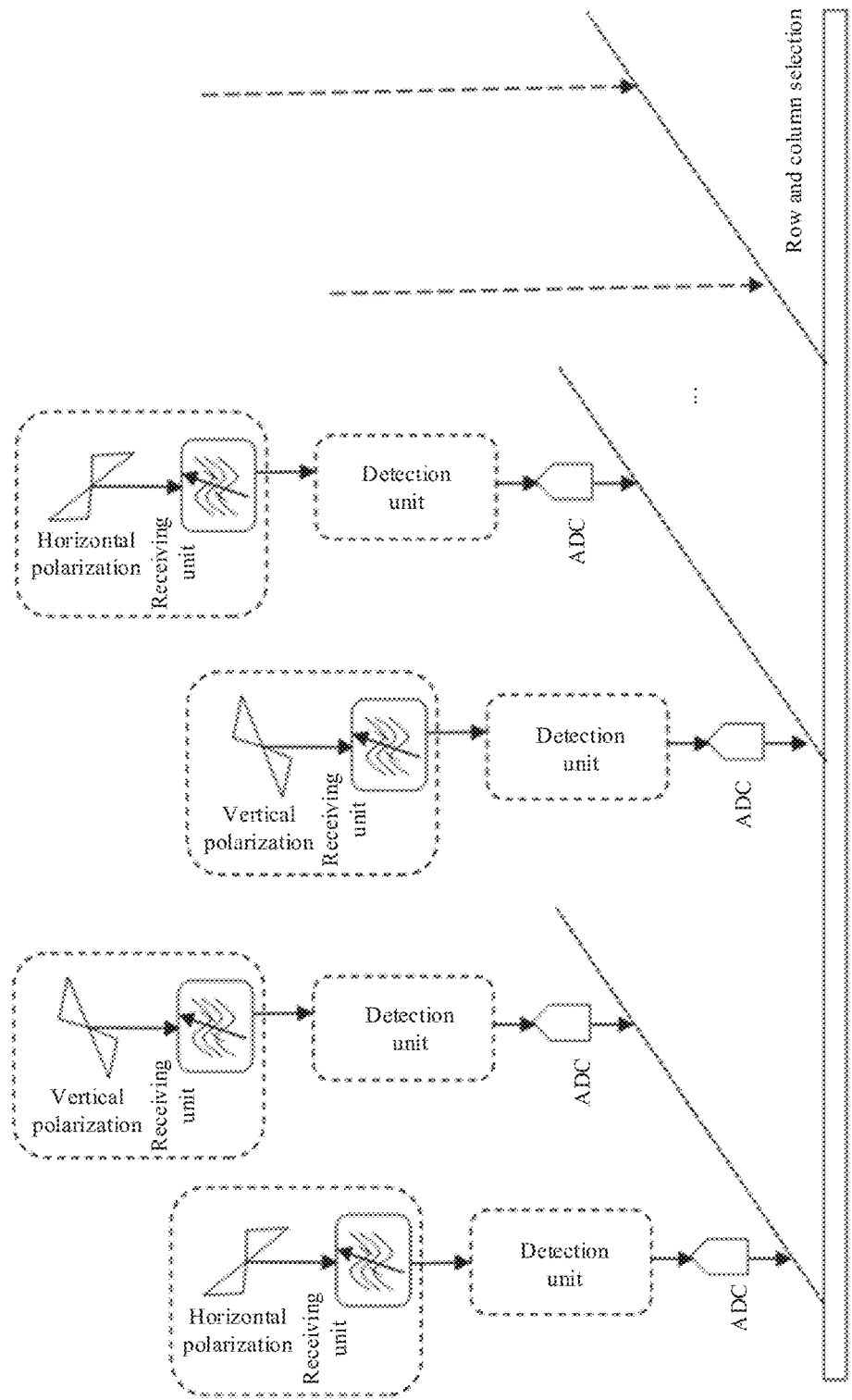
FIG. 9-A

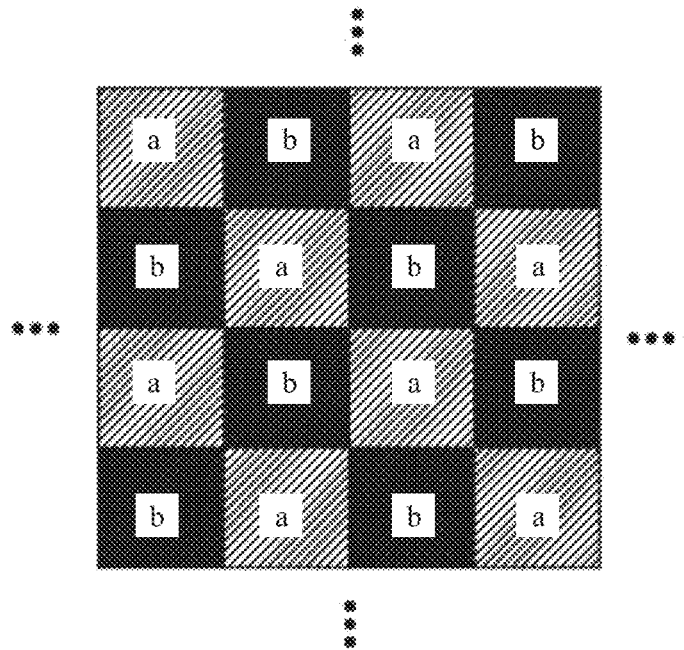
FIG. 9-B
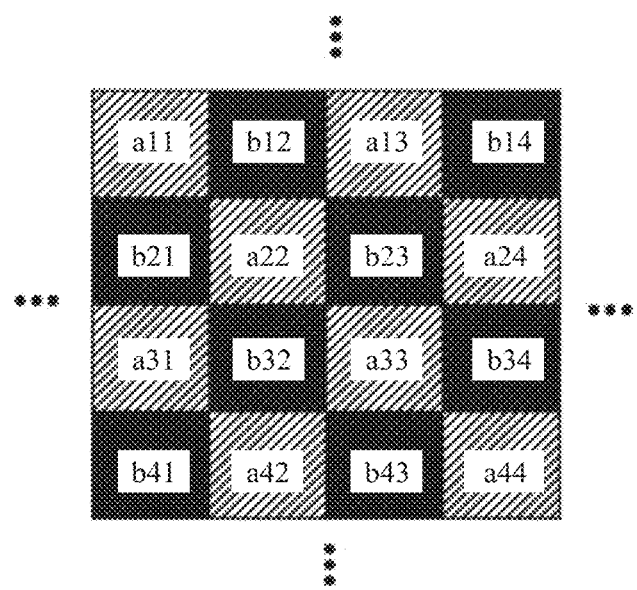
FIG. 9-C

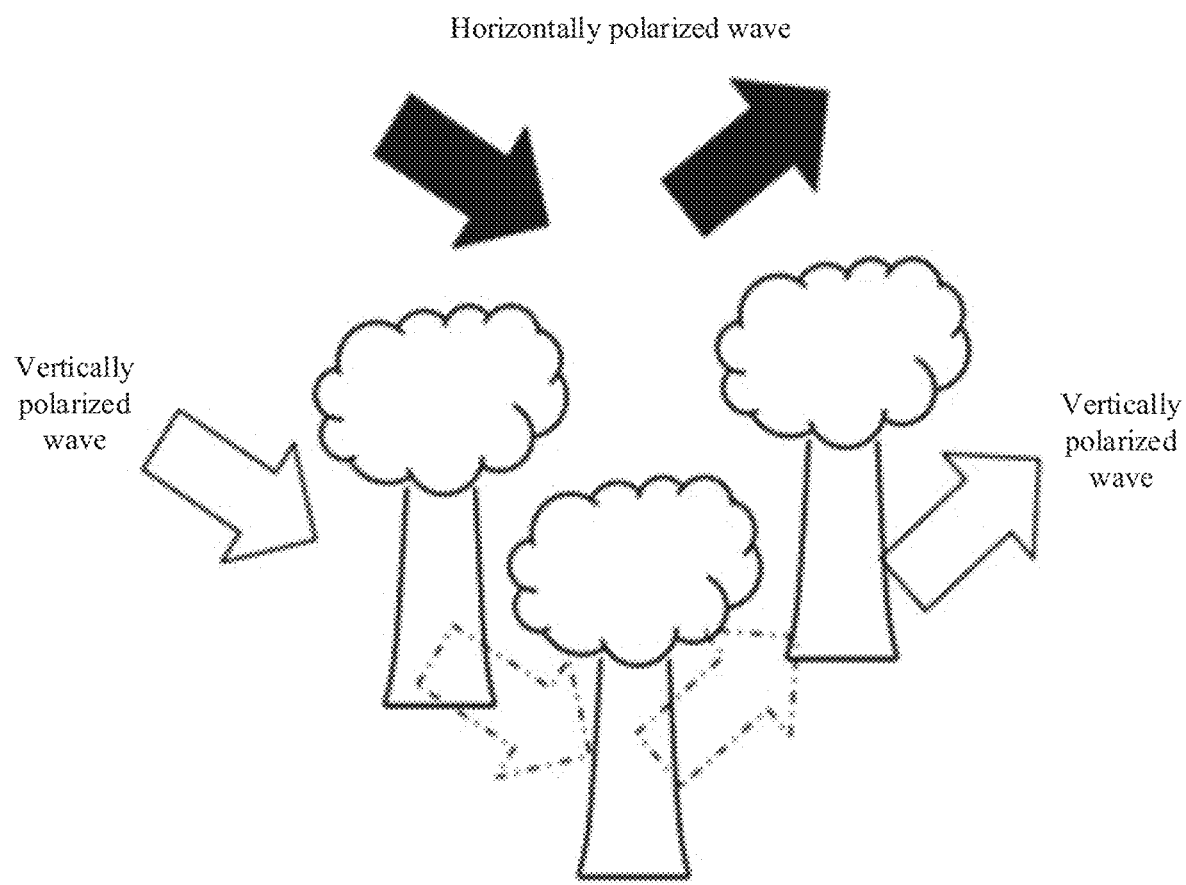
FIG. 9-D

TERAHERTZ SENSING SYSTEM AND TERAHERTZ SENSING ARRAY

CROSS-REFERENCE TO RELATED APPLICATIONS

This application is a continuation of International Application No. PCT/CN2020/137734, filed on Dec. 18, 2020, which claims priority to Chinese Patent Application No. 201911321095.6, filed on Dec. 19, 2019. The disclosures of the aforementioned applications are hereby incorporated by reference in their entireties.

TECHNICAL FIELD

This application relates to the field of image detection and processing, and in particular, to some related products such as a terahertz sensing system and a terahertz sensing array.

BACKGROUND

A frequency range of electromagnetic waves is very wide, and in the industry, types of electromagnetic waves are generally divided based on the frequency range. A generalized terahertz (THz) electromagnetic wave (terahertz wave for short) is an electromagnetic wave with a frequency between 100 GHz and 10 THz. The terahertz wave has unique radiation characteristics.

Penetrability: The terahertz wave can pass through different media at different attenuation rates. The atmosphere has a complex absorption effect on the terahertz wave.

High resolution: Imaging resolution increases as a wavelength of an electromagnetic wave decreases, and imaging resolution of the terahertz wave is higher than imaging resolution of a microwave.

Spectroscopy: Different solid and gas materials have different spectral characteristics for terahertz waves of 0.5 to 3 THz. For example, resonance frequencies of many biological proteins, organic macromolecules, electrons in semiconductors, and nanostructures fall in a terahertz frequency band, so that the terahertz waves may be used for material detection.

Non-ionization: Photon energy of the terahertz wave is low, and does not excite an ionization effect of an object. Therefore, application of the terahertz wave is safe.

Therefore, using the terahertz wave to sense a structure/substance becomes a popular direction, and also begins to be considered as an important research direction by some enterprises and research institutions in the industry.

SUMMARY

This application provides related products such as a terahertz sensing system and a terahertz sensing array.

A first aspect of embodiments of this application provides a terahertz sensing array. The terahertz sensing array includes N sensing unit groups arranged in an array form, and each of the N sensing unit groups includes M reconfigurable sensing units (the M reconfigurable sensing units may be some or all sensing units included in the sensing unit group). Each of the M reconfigurable sensing units is configured to detect one type of terahertz wave physical characteristic parameter. The type of the terahertz wave physical characteristic parameter detected by the reconfigurable sensing unit may vary based on a detection configuration. N and M are positive integers greater than 1.

The reconfigurable sensing unit indicates that the type of the terahertz wave physical characteristic parameter that can be detected by the sensing unit may vary based on the detection configuration. That is, the reconfigurable sensing unit indicates that the detection configuration is variable (reconfigurable). Therefore, the type of the terahertz wave physical characteristic parameter that can be detected by the reconfigurable sensing unit may be configured based on a requirement.

One reconfigurable sensing unit in each sensing unit group may be configured to detect only one type of terahertz wave physical characteristic parameter, M reconfigurable sensing units in one sensing unit group may detect K different types of terahertz wave physical characteristic parameters in total, and K is a positive integer greater than 1 and less than M.

For example, the K different types of terahertz wave physical characteristic parameters include K different frequency bands of terahertz radiation waves. Alternatively, the K types of terahertz physical characteristic parameters include K different types of polarization of terahertz radiation waves.

For example, when M is equal to K, each of M reconfigurable sensing units in one sensing unit group is configured to detect a different type of terahertz wave physical characteristic parameter. For example, M=K=4. In this case, each of the M reconfigurable sensing units is configured to detect a different type of terahertz wave physical characteristic parameter in the four types of terahertz wave physical characteristic parameters.

For example, when M is greater than K, some reconfigurable sensing units in M reconfigurable sensing units in one sensing unit group are configured to detect different types of terahertz wave physical characteristic parameters, and the other reconfigurable sensing units in the M reconfigurable sensing units are configured to detect a same type of terahertz wave physical characteristic parameter. For example, M=5, and K=4. In this case, each of four reconfigurable sensing units in the five reconfigurable sensing units is configured to detect a different type of terahertz wave physical characteristic parameter in the four types of terahertz wave physical characteristic parameters, and the remaining one reconfigurable sensing unit is also configured to detect one of the four types of terahertz wave physical characteristic parameters. The rest can be deduced in a same manner. That is, when M is greater than K, at least two reconfigurable sensing units in the M reconfigurable sensing units are configured to detect a same type of terahertz wave physical characteristic parameter.

It can be learned that the terahertz sensing array includes the N sensing unit groups arranged in the array form, and each of the N sensing unit groups includes the M reconfigurable sensing units. The type of the terahertz wave physical characteristic parameter detected by the reconfigurable sensing unit may vary based on the detection configuration. That is, a detection capability of the reconfigurable sensing unit is reconfigurable, so that the detection capability (for example, a detection frequency band distribution or a polarization characteristic) of the reconfigurable sensing unit may be adaptively and flexibly adjusted based on a characteristic of a to-be-detected object, thereby improving sensing flexibility of the terahertz sensing array, and enhancing an application scenario of the terahertz sensing array, especially for a terahertz spectrometry/imaging scenario.

A reconfigurable sensing unit dij in the N sensing unit groups includes a receiving unit, a detection unit, and an analog-to-digital conversion unit, and the reconfigurable sensing unit dij belongs to one (for example, any one) of the N sensing unit groups.

An input end of the detection unit is connected to an output end of the receiving unit, and an input end of the analog-to-digital conversion unit is connected to an output end of the detection unit.

The receiving unit is configured to receive a terahertz radiation wave with a type of physical characteristic parameter and convert the terahertz radiation wave into a terahertz guided wave.

The detection unit is configured to convert the terahertz guided wave obtained through conversion by the receiving unit into a low-frequency signal response or a direct-current signal response.

The analog-to-digital conversion unit is configured to collect the low-frequency signal response or the direct-current signal response obtained through conversion by the detection unit, to obtain a digital signal response.

A second aspect of the embodiments of this application provides a terahertz sensing system, which may include a back-end processing system and a terahertz sensing array. The terahertz sensing array may be any terahertz sensing array provided in the first aspect.

The back-end processing system is configured to receive a digital signal response that is corresponding to a detected type of terahertz wave physical characteristic parameter and that is output by a reconfigurable sensing unit in the terahertz sensing array, and obtain, by performing interpolation based on the received digital signal response output by the reconfigurable sensing unit, a digital signal response corresponding to a type of terahertz wave physical characteristic parameter not detected by the reconfigurable sensing unit.

Each reconfigurable sensing unit is configured to detect only one type of terahertz physical characteristic parameter. A digital signal response corresponding to a type of terahertz wave physical characteristic parameter not detected by a reconfigurable sensing unit is obtained by performing interpolation based on a digital signal response output by a reconfigurable sensing unit around the reconfigurable sensing unit.

For example, the back-end processing system is configured to receive a digital signal response that is corresponding to a detected type of terahertz wave physical characteristic parameter and that is output by a reconfigurable sensing unit dij in the terahertz sensing array, and may obtain, by performing interpolation based on a received digital signal response output by a reconfigurable sensing unit around the reconfigurable sensing unit dij, a digital signal response corresponding to a type of terahertz wave physical characteristic parameter not detected by the reconfigurable sensing unit dij.

Specifically, for example, a digital signal response corresponding to an $x^{th}$ type of terahertz wave physical characteristic parameter not detected by the reconfigurable sensing unit dij may be obtained by performing interpolation based on digital signal responses output by at least two reconfigurable sensing units that are around the reconfigurable sensing unit dij and that are configured to detect the $x^{th}$ type of terahertz wave physical characteristic parameter, the $x^{th}$ type of terahertz wave physical characteristic parameter is one type of terahertz wave physical characteristic parameter in K-1 types of terahertz wave physical characteristic parameters not detected by the reconfigurable sensing unit dij, and x is a positive integer greater than 1.

It can be learned that the terahertz sensing system includes the back-end processing system and the terahertz sensing array, the terahertz sensing array includes the N sensing unit groups arranged in the array form, and each of the N sensing unit groups includes the M reconfigurable sensing units. The type of the terahertz wave physical characteristic parameter detected by the reconfigurable sensing unit may vary based on the detection configuration. That is, a detection capability of the reconfigurable sensing unit is reconfigurable, so that the detection capability (for example, a detection frequency band distribution or a polarization characteristic) of the reconfigurable sensing unit may be adaptively and flexibly adjusted based on a characteristic of a to-be-detected object, thereby improving sensing flexibility of the terahertz sensing array, and enhancing an application scenario of the terahertz sensing array, especially for a terahertz spectrometry/imaging scenario. In addition, the back-end processing system may obtain, by performing interpolation based on the received digital signal response output by the reconfigurable sensing unit, the digital signal response corresponding to the type of terahertz wave physical characteristic parameter not detected by the reconfigurable sensing unit. Therefore, this helps obtain a plurality of types of terahertz wave physical characteristic parameters by performing imaging/spectrometry once, thereby effectively reducing complexity of imaging/spectrometry, and further helping improve detection efficiency.

In some possible implementations, the back-end processing system may be further configured to: assign a color identifier to a digital signal response that is of each reconfigurable sensing unit and that is corresponding to each type of terahertz wave physical characteristic parameter; separately combine digital signal responses that are of reconfigurable sensing units and to which a same color identifier is assigned, to form K monochrome images; and combine the K monochrome images into a pseudo-color image (the pseudo-color image with a plurality of colors may be used to identify a substance distribution or the like), where there are one-to-one correspondences between the K monochrome images and K types of terahertz wave physical characteristic parameters.

A third aspect of this application provides a back-end processing system. The back-end processing system is coupled to a terahertz sensing array. The terahertz sensing array is any terahertz sensing array provided in the first aspect.

The back-end processing system is configured to receive a digital signal response that is corresponding to a detected type of terahertz wave physical characteristic parameter and that is output by a reconfigurable sensing unit in the terahertz sensing array, and obtain, by performing interpolation based on the received digital signal response output by the reconfigurable sensing unit, a digital signal response corresponding to a type of terahertz wave physical characteristic parameter not detected by the reconfigurable sensing unit.

A fourth aspect of the embodiments of this application provides a computer-readable storage medium. The computer-readable storage medium stores a computer program, and when the computer program is executed by a processor, some or all functions of the back-end processing system in the second aspect or the third aspect can be implemented.

A fifth aspect of the embodiments of this application provides a back-end processing system. The back-end processing system includes a processor and a memory that are coupled, and the processor is configured to invoke a program stored in the memory, to implement some or all functions of the back-end processing system in the second aspect or the third aspect.

A sixth aspect of the embodiments of this application provides a computer program product. When the computer program product is run on a computer device, the computer device is enabled to perform some or all functions of the back-end processing system in the second aspect or the third aspect.

BRIEF DESCRIPTION OF DRAWINGS

The following describes some accompanying drawings in embodiments of this application.

FIG. 3-A is a schematic diagram of a structure of a sensing unit according to an embodiment of this application;

FIG. 3-B to FIG. 3-D are schematic diagrams of structures of several receiving units according to an embodiment of this application;

FIG. 3-E is a schematic diagram of a structure of a detection unit according to an embodiment of this application;

FIG. 4(a) and FIG. 4(b) are a schematic diagram of presentation of a component analysis result of a terahertz sensing system according to an embodiment of this application;

FIG. 5-A is a schematic diagram of a transmissive mode of a terahertz sensing system according to an embodiment of this application;

FIG. 5-B is a schematic diagram of a reflective mode of a terahertz sensing system according to an embodiment of this application;

FIG. 6-A to FIG. 6-D are schematic diagrams of several terahertz sensing arrays according to examples in an embodiment of this application;

FIG. 6-E is a schematic diagram of another terahertz sensing array according to an example in an embodiment of this application;

FIG. 8-A is a schematic diagram of another terahertz sensing array according to an example in an embodiment of this application;

FIG. 8-B is a schematic diagram of detecting a partial array of a terahertz sensing array according to an example in an embodiment of this application;

FIG. 8-C is a schematic diagram of a partial array of a terahertz sensing array according to an example in an embodiment of this application;

FIG. 8-D to FIG. 8-F are schematic diagrams of several transmittance spectra according to examples in an embodiment of this application;

FIG. 9-A is a schematic diagram of another terahertz sensing array according to an example in an embodiment of this application;

FIG. 9-B is a schematic diagram of detecting a partial array of another terahertz sensing array according to an example in an embodiment of this application;

FIG. 9-C is a schematic diagram of a partial array of another terahertz sensing array according to an example in an embodiment of this application; and FIG. 9-D is a schematic diagram of vegetation detection using a polarized wave according to an example in an embodiment of this application.

DESCRIPTION OF EMBODIMENTS

The following describes some solutions in embodiments of this application with reference to accompanying drawings in the embodiments of this application.

Figure 1:
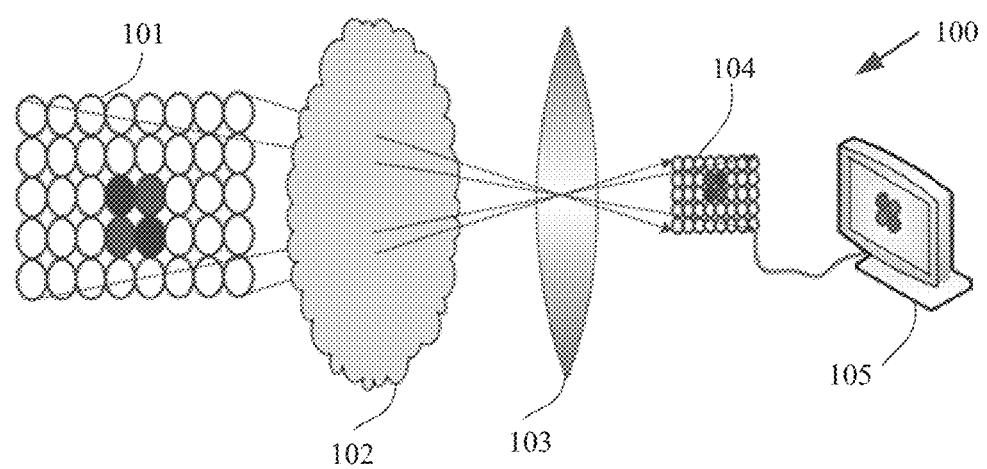
FIG. 1 is a schematic diagram of an architecture of a terahertz sensing system according to an embodiment of this application.

FIG. 1 is a schematic diagram of a structure of a terahertz sensing system according to an example in an embodiment of this application. A terahertz sensing system 100 uses a terahertz light source to irradiate a to-be-detected object 101 (Objects). A terahertz wave reflected by the to-be-detected object 101 passes through a transmission path 102 and is focused by a focusing system 103 (for example, a lens group) on a terahertz sensing array 104 located in a focal plane. The terahertz sensing array 104 may convert the terahertz wave into a corresponding digital signal, and a back-end processing system 105 may perform imaging, spectrometry, or the like on the to-be-detected object 101 based on the corresponding digital signal.

The terahertz wave (THz wave) is short for a terahertz electromagnetic wave or a terahertz radiation wave. The terahertz wave, the terahertz electromagnetic wave, and the terahertz radiation wave may be mixed in a description of this embodiment of this application.

Figure 2:
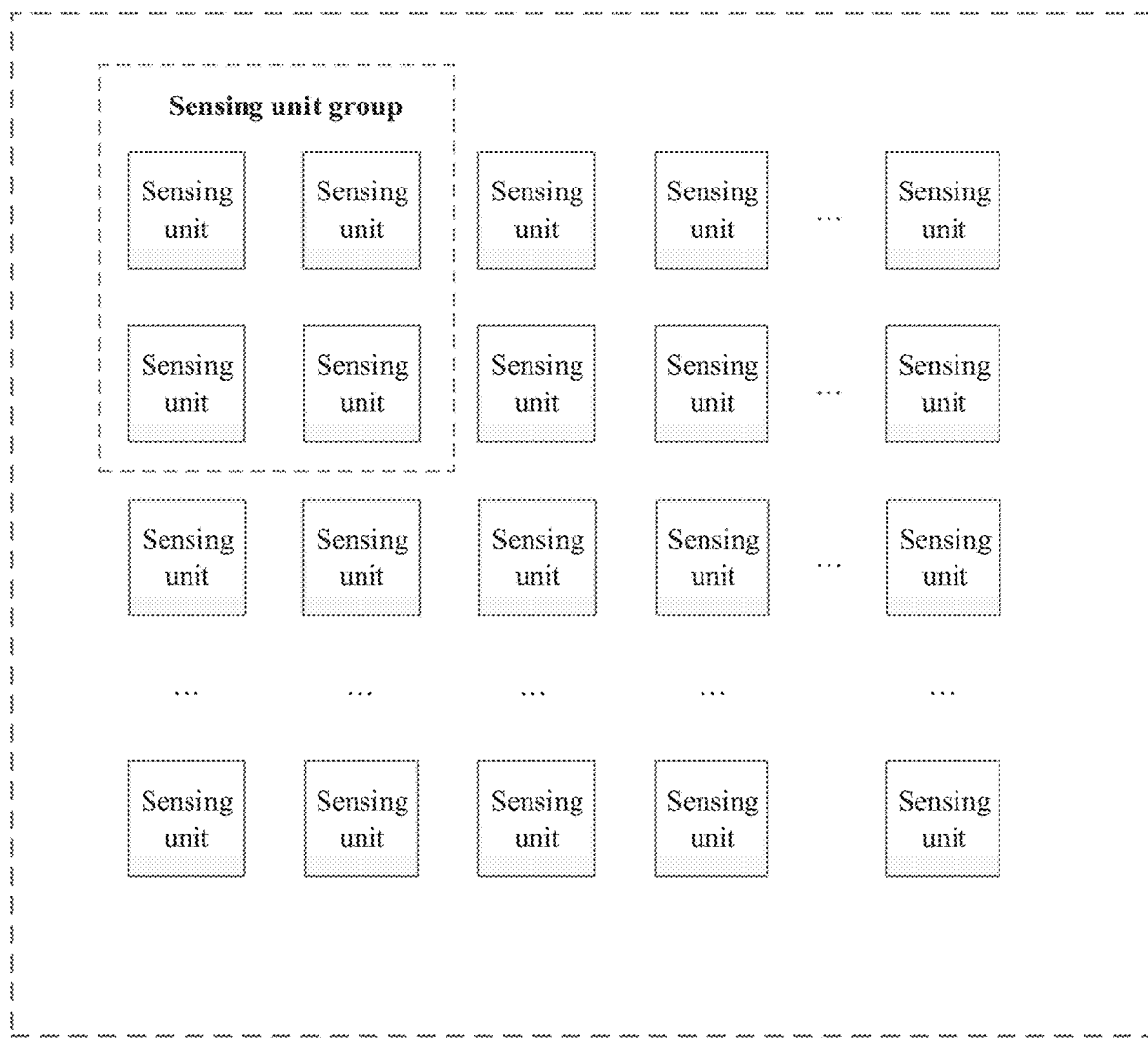
FIG. 2 is a schematic diagram of arrangement of a terahertz sensing array according to an embodiment of this application.

The terahertz sensing array located in the focal plane is an important part of the terahertz sensing system. A possible terahertz sensing array may be an example shown in FIG. 2. A surface of the terahertz sensing array may include a plurality of sensing units operating in a THz frequency band (the sensing unit may also be referred to as a "pixel", and therefore, the sensing unit and the pixel may be mixed in the description of this embodiment of this application). The sensing unit is, for example, a reconfigurable sensing unit or a non-reconfigurable sensing unit.

The reconfigurable sensing unit indicates that a type of a terahertz wave physical characteristic parameter that can be detected by the sensing unit may vary based on a detection configuration. That is, the detection configuration of the reconfigurable sensing unit is variable (reconfigurable), and a detection capability of the reconfigurable sensing unit is variable (reconfigurable). Therefore, the type of the terahertz wave physical characteristic parameter that can be detected by the reconfigurable sensing unit may be configured based on a requirement.

The non-reconfigurable sensing unit indicates that a type of a terahertz wave physical characteristic parameter that can be detected by the sensing unit cannot vary based on a detection configuration. That is, the detection configuration of the non-reconfigurable sensing unit is immutable (non-reconfigurable), and a detection capability of the non-reconfigurable sensing unit is immutable (non-reconfigurable).

Refer to FIG. 3-A. A sensing unit 300 includes a receiving unit 301, a detection unit 302, and an analog-to-digital conversion unit 303. The sensing unit 300 can detect a type of terahertz wave physical characteristic parameter. The receiving unit 301 may include, for example, an antenna, a filter, and the like. Based on different technologies, the detection unit 302 may be, for example, a superheterodyne receiver, a square-law detector, a triode detector, a thermal radiometer, or an optical-to-electrical converter.

FIG. 3-B to FIG. 3-D show several possible structures of the receiving unit 301 as examples. The receiving unit 301 may include an antenna and a filter, or the receiving unit 301 may include horizontal polarization antenna and a filter, or the receiving unit 301 may include vertical polarization antenna and a filter.

FIG. 3-E shows a possible structure of the detection unit 302 as an example. The detection unit 302 may include a detector and an amplifier.

Specifically, for example, the receiving unit 301 may be configured to receive a terahertz radiation wave with a type of physical characteristic parameter and convert the terahertz radiation wave into a terahertz guided wave. The detection unit 302 may be configured to convert the terahertz guided wave obtained through conversion by the receiving unit 301 into a low-frequency signal response or a direct-current signal response. The analog-to-digital conversion unit 303 may be configured to perform digital signal collection on the low-frequency signal response or the direct-current signal response obtained through conversion by the detection unit 302, to obtain a digital signal response.

A spectral property of the THz wave is used in a sensing process. For example, when the terahertz light source is used to irradiate the to-be-detected object, if the to-be-detected object includes some specific components, these specific components resonate with a terahertz wave of a specific frequency band and are absorbed in a large amount. For a reflected terahertz wave, a minimum point appears in the frequency band and can be clearly distinguished in a spectrum. This phenomenon is referred to as a terahertz fingerprint spectrum of a substance. A terahertz fingerprint spectrum effect may be detected by using a terahertz time domain spectroscopy or a terahertz frequency domain spectroscopy. The terahertz sensing system is used to identify the fingerprint spectrum, can visually present a distribution of an absorption area on a structure of the substance, and has great convenience compared with a conventional terahertz time domain spectroscopy (TDS, Time Domain Spectroscopy).

During specific implementation, some terahertz sensing systems usually use an intermediate frequency solution. Specifically, a receiving unit in each sensing unit is broadband and can cover all required frequency bands. After a signal is received, the signal is divided into three signals by performing power division, and signals of three required frequency bands are selected by using a filter and then amplified. Then, local oscillator signals of three different frequencies are input to be mixed with received signals, to obtain corresponding low-frequency signals for processing. In this solution, three detection units are integrated in one sensing unit.

In the intermediate frequency solution, the receiving unit needs to have an ultra-wideband receiving capability to cover the required frequency bands. After a signal is received, power division and filtering operations are performed. These operations further attenuate the received signal that is already weak, and a signal-to-noise ratio of the entire system is greatly affected. In addition, in the THz frequency band, a size of each pixel, that is, antenna spacing, sharply decreases as a wavelength decreases. For example, in a 300 GHz frequency band, it is assumed that pixel spacing is a ½ wavelength, and a distance is 0.5 mm. Three superheterodyne receivers are arranged in a range of 0.5 mm. This is very challenging even for a chip-level circuit, and if the frequency band is increased to 3000 GHz, arrangement is almost impossible. If an area of each pixel is increased for arrangement, spatial resolution of an imaging array is reduced. In addition, this multi-local oscillator solution also increases complexity of the system. For a large array area (above 100 pixels), an entire local oscillator distribution link is very large, and a loss is also very high. This may even cause power after distribution to be too low to drive a related mixer.

In some other terahertz sensing systems, narrowband THz waves of different frequencies are used to irradiate the to-be-detected object for a plurality of times, and a terahertz sensing array with same broadband is used for sensing and imaging each time. Each frequency is defined as a specific color during post processing. Finally, a plurality of monochrome images are combined into a multi-chromatographic image, that is, a pseudo-color image. Types and distributions of various substances may be identified based on distributions of various color components and a distribution of a combined color component in the pseudo-color image. For example, as shown in FIG. 4(a) and FIG. 4(b), a terahertz sensing system separately performs imaging on four drugs at 0.76 THz, 1.84 THz, 2.52 THz, 3.1 THz, and 4.25 THz. The four drugs are respectively 10% tartaric acid (TA), 5% mixture of sucrose and tartaric acid (SC/TA), 10% sucrose, and polytetrafluoroethylene (PTFE). From imaging results shown in FIG. 4(a) and FIG. 4(b), it can be learned that the four substances and mixtures can be better distinguished in multi-chromatographic imaging than single-chromatographic imaging. However, such a terahertz sensing system needs to perform collection and imaging for a plurality of times, which takes a long time, and a plurality of narrowband filters or narrowband light sources need to be additionally prepared.

To detect absorption spectra of a plurality of substances on the terahertz sensing array, it may be considered to integrate sensing units of different frequency bands/polarization or modes on the terahertz sensing array. How to well balance detection time of a plurality of physical quantities and try not to affect spatial resolution and fields of view of these sensing units in the focal plane, and a possibility of engineering implementation are problems to be considered.

The following continues to explore related implementation solutions.

The following provides some examples of solutions that are applicable to a sensing application scenario of a terahertz substance structure/absorption spectrum. Terahertz sensing modes may be divided into a transmissive mode and a reflective mode. Refer to FIG. 5-A. In the transmissive mode, a to-be-detected object is placed between a light source and a terahertz sensing array. After a terahertz wave passes through the to-be-detected object, absorption degrees of the to-be-detected object at different positions are inconsistent, and details of the absorption degrees are presented on the terahertz sensing array. Refer to FIG. 5-B. In the reflective mode, a light source and a terahertz sensing array are placed on a same side. Different positions of a to-be-detected object have different THz wave reflectivity, and details of the THz wave reflectivity are presented on the terahertz sensing array.

It may be understood that both the transmissive and reflective sensing modes include an interaction process between a substance and a terahertz wave. For some macromolecular substances, a molecular or lattice size is just resonant in a specific frequency band, so that the macromolecular substances have a strong absorption effect on terahertz waves in the frequency band. Different substances have different absorption attenuation curves of a terahertz wave spectrum, or have different reflectivity for terahertz waves of different polarization. This phenomenon is referred to as a terahertz fingerprint spectrum of a substance. A substance may be identified by capturing spectral information or polarization information of the substance from a reflected/transmitted wave.

FIG. 6-A to FIG. 6-D are schematic diagrams of several terahertz sensing arrays according to examples in an embodiment of this application.

A terahertz sensing array 600 may include N sensing unit groups arranged in an array form (the N sensing unit groups may be some or all sensing unit groups included in the terahertz sensing array 600), and each of the N sensing unit groups includes M reconfigurable sensing units. Each of the M reconfigurable sensing units is configured to detect one type of terahertz wave physical characteristic parameter.

N and M are positive integers greater than 1.

For example, M is equal to 2, 3, 4, 5, 6, 7, 8, 9, 10, 12, 15, 16, 19, 20, 32, 64, or another value.

For example, N is equal to 2, 3, 5, 10, 100, 10000, 50000, 10000000, 100000000, or another value.

FIG. 6-A shows an example in which M reconfigurable sensing units in any sensing unit group are all sensing unit groups included in the sensing unit group.

FIG. 6-B shows an example in which M reconfigurable sensing units in any sensing unit group may be some sensing unit groups included in the sensing unit group.

FIG. 6-C shows an example in which M reconfigurable sensing units in each of some sensing unit groups are all sensing unit groups included in the sensing unit group, and M reconfigurable sensing units in each of the other sensing unit groups are some sensing unit groups included in the sensing unit group.

FIG. 6-D shows an example in which M reconfigurable sensing units in each of some sensing unit groups are all sensing unit groups included in the sensing unit group, M reconfigurable sensing units in each of other sensing unit groups are some sensing unit groups included in the sensing unit group, and some other sensing unit groups do not include reconfigurable sensing units.

Refer to FIG. 6-E. A reconfigurable sensing unit dij in the N sensing unit groups includes a receiving unit, a detection unit, and an analog-to-digital conversion unit. The detection unit is connected to the receiving unit, and the analog-to-digital conversion unit is connected to the detection unit. The reconfigurable sensing unit dij belongs to one of the N sensing unit groups. For example, i in dij represents a row number of the reconfigurable sensing unit in the terahertz sensing array, and j represents a column number of the reconfigurable sensing unit in the terahertz sensing array.

An arrangement manner of the terahertz sensing array is not limited to FIG. 6-A to FIG. 6-D, and another arrangement manner may be designed based on a requirement.

The sensing units (reconfigurable sensing units and/or non-reconfigurable sensing units) may be coupled to, for example, a row and column selection bus and a bias loading bus.

The following uses an example in which the sensing unit group includes at least one reconfigurable sensing unit for description.

The receiving unit is configured to receive a terahertz radiation wave with a type of physical characteristic parameter and convert the terahertz radiation wave into a terahertz guided wave.

The detection unit is configured to convert the terahertz guided wave obtained through conversion by the receiving unit into a low-frequency signal response or a direct-current signal response.

The analog-to-digital conversion unit is configured to collect the low-frequency signal response or the direct-current signal response obtained through conversion by the detection unit, to obtain a digital signal response.

To improve quantization precision, a bit width of the analog-to-digital conversion unit may be 14 bits or 16 bits. Certainly, the bit width of the analog-to-digital conversion unit may alternatively be another bit quantity that meets a requirement.

One reconfigurable sensing unit in each sensing unit group may be configured to detect only one type of terahertz wave physical characteristic parameter, M reconfigurable sensing units in one sensing unit group may detect K different types of terahertz wave physical characteristic parameters in total, and K is a positive integer greater than 1 and less than M.

For example, the K different types of terahertz wave physical characteristic parameters include K different frequency bands of terahertz radiation waves. For another example, the K types of terahertz physical characteristic parameters include K different types of polarization of terahertz radiation waves.

It may be understood that the type of the terahertz wave physical characteristic parameter that can be detected by the reconfigurable sensing unit may vary based on a detection configuration. Therefore, for example, a reconfigurable sensing unit may be configured, based on a requirement, to detect only a terahertz wave physical characteristic parameter of 1.2 THz frequency band. Alternatively, a reconfigurable sensing unit may be configured, based on a requirement, to detect only a terahertz wave physical characteristic parameter of 1.5 THz, 2 THz, or 2.7 THz frequency band. Alternatively, a reconfigurable sensing unit may be configured, based on a requirement, to detect only a terahertz wave physical characteristic parameter of vertical polarization or horizontal polarization.

In a specific implementation process, the receiving unit in the reconfigurable sensing unit is, for example, a reconfigurable receiving unit. Specifically, a phase-change material, an MEMS, a transistor, or the like may be used to implement a reconfigurable receiving capability of the reconfigurable receiving unit on a terahertz wave physical characteristic parameter such as a frequency band, polarization, or a mode.

Figure 7:
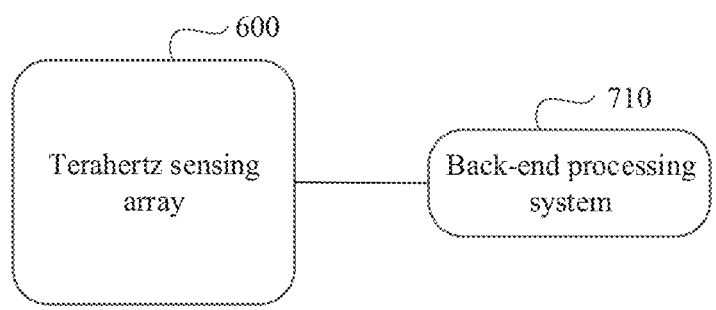
FIG. 7 is a schematic diagram of an architecture of another terahertz sensing system according to an embodiment of this application.

FIG. 7 is a schematic diagram of a terahertz sensing system according to an example in an embodiment of this application. A terahertz sensing system includes a back-end processing system 710 and a terahertz sensing array 600.

The back-end processing system 710 is configured to receive a digital signal response that is corresponding to a detected type of terahertz wave physical characteristic parameter and that is output by a reconfigurable sensing unit in the terahertz sensing array, and obtain, by performing interpolation based on the received digital signal response output by the reconfigurable sensing unit, a digital signal response corresponding to a type of terahertz wave physical characteristic parameter not detected by the reconfigurable sensing unit.

Each reconfigurable sensing unit is configured to detect only one type of terahertz physical characteristic parameter. For example, a digital signal response corresponding to a type of terahertz wave physical characteristic parameter not detected by a reconfigurable sensing unit is obtained by performing interpolation based on a digital signal response output by a reconfigurable sensing unit around the reconfigurable sensing unit.

Specifically, for example, a digital signal response corresponding to an $x^{th}$ type of terahertz wave physical characteristic parameter not detected by the reconfigurable sensing unit dij is obtained by performing interpolation based on digital signal responses output by at least two reconfigurable sensing units that are around the reconfigurable sensing unit dij and that can detect the $x^{th}$ type of terahertz wave physical characteristic parameter, and the $x^{th}$ type of terahertz wave physical characteristic parameter is one type of terahertz wave physical characteristic parameter in K−1 types of terahertz wave physical characteristic parameters not detected by the reconfigurable sensing unit dij.

In addition, the back-end processing system 710 may be further configured to: assign a color identifier to a digital signal response that is of each reconfigurable sensing unit and that is corresponding to each type of terahertz wave physical characteristic parameter; separately combine digital signal responses that are of reconfigurable sensing units and to which a same color identifier is assigned, to form K monochrome images; and combine the K monochrome images into a pseudo-color image, where there are one-to-one correspondences between the K monochrome images and K types of terahertz wave physical characteristic parameters.

The following uses examples to separately describe scenarios in which terahertz wave physical characteristic parameters include different frequency bands and different polarization of terahertz radiation waves.

Refer to an example shown in FIG. 8-A. One sensing unit group in a terahertz sensing array may collectively detect different frequency bands of terahertz radiation waves. A receiving unit in a sensing unit includes a reconfigurable filter and a broadband antenna that can receive THz waves of a full spectrum. The reconfigurable filter is, for example, a band-pass filter, and a passband range of the band-pass filter may be adjusted through electric control, to implement receiving capability configuration for different frequency bands. For example, receiving frequency bands of the reconfigurable filter are configured as four frequencies: 1.2 THz, 1.5 THz, 2 THz, and 2.7 THz. A detection unit may include, for example, a triode detector and an intermediate frequency amplifier.

Sensing units are coupled to a row and column selection bus and a bias loading bus. Four pixels of different frequencies form a 2*2 square array, that is, a sensing unit group. The entire terahertz sensing array includes arranged sensing unit groups, and an arrangement manner may be shown in an example in FIG. 8-B, where a=1.2 THz, b=1.5 THz, c=2.0 THz, and d=2.7 THz.

During imaging, transmissive or reflective imaging may be used. Transmissive imaging is used as an example. Spherical light emitted by a terahertz light source is converted into uniform planar light by using a lens group, the uniform planar light is shining onto a substance, an imaging lens group is placed in a penetrating direction, and the terahertz sensing array is located in a focal plane of the imaging lens group.

A THz wave passes through a to-be-detected object, and based on a molecular size and a molecular distribution of the to-be-detected object, THz waves of different frequency bands have different transmittance. Each pixel in a sensing unit group receives transmitted wave strength of a related frequency. For ease of description, the following uses a 4*4 partial array of the terahertz sensing array for description, and i and j are used to distinguish pixels at different positions. Refer to FIG. 8-C. For example, a pixel d22 is used as an example, and the pixel d22 is configured to receive only terahertz wave strength of 2.7 THz. In this case, during imaging, for the pixel d22, information components of three frequency bands 1.2 THz, 1.5 THz, and 2 THz are missing. The missing information components may be added by performing interpolation based on digital signal responses output by surrounding pixels.

Specifically, for example, a 1.2 THz information component on the pixel d22 may be obtained by performing interpolation based on information about nearest pixels of a class a:

$$d22(a)=f(a11,a13,a31,a33)=(a11+a13+a31+a33)/4$$

Specifically, for example, a 1.5 THz information component on the pixel d22 may be obtained by performing interpolation based on information about nearest pixels of a class b:

$$d22(b)=f(b12,b32)=(b12+b32)/2$$

Specifically, for example, a 2 THz information component on the pixel d22 may be obtained by performing interpolation based on information about nearest pixels of a class c:

$$d22(c)=f(c21,c23)=(c21+c23)/2$$

Similarly, missing information components that are on aij and that are corresponding to frequency bands such as b, c, and d, missing information components that are on bij and that are corresponding to frequency bands such as a, c, and d, and missing information components that are on cij and that are corresponding to frequency bands such as a, b, and d may all be obtained in the interpolation manner in the foregoing example, and full-band information of the entire terahertz sensing array may be finally supplemented.

During image combination, each pixel already has four pieces of strength information a, b, c, and d. Red R is assigned to a, and strength of a is red strength of the pixel. Green G is assigned to b, and strength of b is green strength of the pixel. Blue B is assigned to c, and strength of c is blue strength of the pixel. Cyan C is assigned to d, and strength of d is cyan strength of the pixel. Finally, a pseudo-color image may be obtained through combination. In an RGB system, cyan C=G+B. A higher terahertz wave frequency band leads to weaker power and penetrability, and use of cyan helps increase signal-to-noise ratios of G and B components defined at high frequencies.

Refer to FIG. 8-D to FIG. 8-F. FIG. 8-D is a schematic diagram of a transmittance spectrum corresponding to glucose, FIG. 8-E is a schematic diagram of a transmittance spectrum corresponding to sorbose, and FIG. 8-F is a schematic diagram of a transmittance spectrum corresponding to salicylic acid. When a broadband THz source is used to irradiate a to-be-detected sample, transmitted THz waves present a specific power spectrum distribution. The three substances have different transmittance spectra at 1.2 THz, 1.5 THz, 2 THz, and 2.7 THz, so that imaging of glucose appears green, imaging of sorbose appears coffee, and imaging of salicylic acid appears green-brown. If there is a mixture of the three substances, distribution statuses of the three substances may also be distinguished in a color spectrum.

It can be learned that, in the terahertz sensing array in the example shown in FIG. 8-A, sensing units of four frequency bands are integrated in one sensing unit group, and specifically, four sensing units of 1.2 THz, 1.5 THz, 2 THz, and 2.7 THz are arranged as one group. Signal strength that is of a corresponding frequency band and that is received by each sensing unit is mapped to strength of a specific primary color. Signal strength received by a sensing unit corresponding to 1.2 THz is red luminance, signal strength received by a sensing unit corresponding to 1.5 THz is green luminance, signal strength received by a sensing unit corresponding to 2 THz is blue luminance, and signal strength received by a sensing unit corresponding to 2.7 THz is cyan luminance. Missing signal strength that is of other frequencies and that is not detected by each sensing unit is obtained by performing interpolation operation based on digital signal responses output by surrounding sensing units, and finally a pseudo-color pattern that may reflect a characteristic of a to-be-detected object may be formed.

Refer to an example shown in FIG. 9-A. One sensing unit group in a terahertz sensing array may collectively detect different polarization of terahertz radiation waves. A receiving unit in a sensing unit includes a filter and a reconfigurable antenna, and the reconfigurable antenna is of, for example, linear polarization, which is distinguished into horizontal linear polarization and vertical linear polarization. Filters are set to a same frequency. A detection unit may include a triode detector and an intermediate frequency amplifier. Sensing units are coupled to a row and column selection bus and a bias loading bus.

Refer to FIG. 9-B. Two pixels of different frequencies form one 1*2 subarray, that is, a sensing unit group, and the entire terahertz sensing array includes sensing unit groups arranged in a staggered manner, where a=horizontally polarized wave, b=vertically polarized wave.

During imaging, transmissive or reflective imaging may be used. Reflective imaging is used as an example. Spherical light emitted by a terahertz light source is converted into uniform planar light by using a lens group, the uniform planar light is shining onto a substance, an imaging lens group is placed in a penetrating direction, and the terahertz sensing array is located in a focal plane of the imaging lens group.

A THz wave passes through a to-be-detected object, and based on a molecular size and a molecular distribution of the to-be-detected object, THz waves of different frequency bands have different transmittance. Each pixel on each 1*2 array unit receives transmitted wave strength of a related frequency. Specifically, for example, refer to FIG. 9-C. For ease of description, the following uses a 4*4 partial array of the terahertz sensing array for description, and i and j are used to distinguish pixels at different positions. A pixel a22 is used as an example, and the pixel a22 can receive only terahertz wave strength of horizontal polarization. During imaging, vertical polarization information of the pixel a22 is missing. The missing vertical polarization information may be added by performing interpolation processing based on digital signal responses output by surrounding pixels.

For example, a vertical polarization information component on the pixel a22 may be obtained by performing interpolation based on information about nearest pixels of a class b:

$$a22(b)=f(b12,b32,b21,b23)=(b12+b32+b21+b23)/4$$

For example, a horizontal polarization information component on a pixel b23 may be obtained by performing interpolation based on information about nearest pixels of a class a:

$$b23(a)=f(a13,a33,a22,a24)=(a13+a33+a22+a24)/4$$

During image combination, each pixel already has strength information a and b. Red R is assigned to a, and strength of a is red strength of the pixel. Cyan C is assigned to b, and strength of b is cyan strength of the pixel. Finally, a pseudo-color image may be obtained through combination.

Refer to FIG. 9-D. For detection of dense vegetation, a vertically polarized wave can penetrate the vegetation to detect ground surface information, and a horizontally polarized wave is reflected at atop of the vegetation. A dual-polarized receiving array can obtain information about two aspects, thereby enhancing a detection effect.

It can be learned that, in the terahertz sensing array in the example shown in FIG. 9-A, sensing units of two types of polarization are integrated in a same sensing unit group, and the two types of polarization are specifically horizontal polarization and vertical polarization. Signal strength received by each sensing unit is mapped to strength of a specific primary color. Signal strength of horizontal polarization is red luminance, and signal strength of vertical polarization is cyan luminance. Signal strength of other polarization on each sensing unit may be obtained by performing interpolation based on digital signal responses output by surrounding sensing units, and finally a pseudo-color pattern is implemented.

Generally, the terahertz sensing arrays in the examples shown in FIG. 8-A and FIG. 9-A may include a plurality of indivisible sensing units (pixels). The pixel has a reconfigurable subunit, that is, the sensing unit is a reconfigurable sensing unit. The reconfigurable sensing unit may be independently set to sense an incident terahertz wave of a specific frequency or polarization characteristic, and convert the terahertz wave into strength information of a digital signal, which may be assigned a specific color as an identifier. Finally, a pseudo-color image with a plurality of colors is generated, and the pseudo-color image may be used to identify a substance distribution and the like. The imaging process is simple, and imaging does not need to be performed for a plurality of times. A plurality of types of information may be obtained by performing imaging once. In addition, the reconfigurable sensing unit is used, so that a detection frequency band distribution or a polarization characteristic may be adjusted based on a characteristic of a to-be-detected object. The imaging process is especially applicable to terahertz spectrometry and imaging scenarios.

It may be understood that functions of functional modules of these products in the product embodiments of this application may be implemented based on related methods in the method embodiments. For specific implementations, refer to the foregoing method embodiments.

An embodiment of this application further provides a computer-readable storage medium. The computer-readable storage medium stores a computer program, the computer program is executed by hardware (for example, a processor) by using some or all steps of any method performed by any device in the embodiments of this application.

An embodiment of this application further provides a computer program product including instructions. When the computer program product is run on a computer device, the computer device is enabled to perform some or all of the steps of any method in the foregoing aspects.

All or some of the foregoing embodiments may be implemented by using software, hardware, firmware, or any combination thereof. When software is used for implementation, all or some of the embodiments may be implemented in a form of a computer program product. The computer program product includes one or more computer instructions. When the computer program instructions are loaded and executed on a computer, the procedures or functions according to the embodiments of this application are all or partially generated. The computer may be a general-purpose computer, a dedicated computer, a computer network, or another programmable apparatus. The computer instructions may be stored in a computer-readable storage medium or may be transmitted from a computer-readable storage medium to another computer-readable storage medium. For example, the computer instructions may be transmitted from a website, computer, server, or data center to another website, computer, server, or data center in a wired (for example, a coaxial cable, an optical fiber, or a digital subscriber line) or wireless (for example, infrared, radio, or microwave) manner. The computer-readable storage medium may be any usable medium accessible by a computer, or a data storage device, such as a server or a data center, integrating one or more usable media. The usable medium may be a magnetic medium (for example, a floppy disk, a hard disk, or a magnetic tape), an optical medium (for example, an optical disc), a semiconductor medium (for example, a solid-state drive), or the like. In the foregoing embodiments, descriptions of the embodiments have respective focuses. For a part that is not described in detail in an embodiment, refer to related descriptions in other embodiments.

In the foregoing embodiments, the descriptions of the embodiments have respective focuses. For a part that is not described in detail in an embodiment, refer to related descriptions in other embodiments.

In the several embodiments provided in this application, it should be understood that the disclosed apparatus may be implemented in other manners. For example, the described apparatus embodiment is merely an example. For example, division into units is merely logical function division or may be other division during actual implementation. For example, a plurality of units or components may be combined or integrated into another system, or some features may be ignored or not performed. In addition, the displayed or discussed mutual indirect couplings or direct couplings or communication connections may be implemented through some interfaces. The indirect couplings or communication connections between the apparatuses or units may be implemented in electronic or other forms.

The units described as separate parts may or may not be physically separate. Parts displayed as units may or may not be physical units, and may be located at one position or may be distributed on a plurality of network units. Some or all units may be selected based on actual needs to achieve the objectives of the solutions of the embodiments.

In addition, functional units in the embodiments of this application may be integrated into one processing unit, or each of the units may exist alone physically, or two or more units are integrated into one unit. The integrated unit may be implemented in a form of hardware, or may be implemented in a form of a software functional unit.

When the integrated unit is implemented in the form of a software functional unit and sold or used as an independent product, the integrated unit may be stored in a computer-readable storage medium. Based on such an understanding, the technical solutions of this application essentially, or the part contributing to the conventional technology, or all or some of the technical solutions may be implemented in the form of a software product. The computer software product is stored in a storage medium and includes several instructions for instructing a computer device (which may be a personal computer, a server, a network device, or the like) to perform all or some of the steps of the methods described in the embodiments of this application. The foregoing storage medium includes: any medium that can store program code, such as a USB flash drive, a removable hard disk, a read-only memory (ROM, read-only memory), a random access memory (RAM, random access memory), a magnetic disk, or an optical disc.

What is claimed is:

1. A terahertz sensing array comprising:
    N sensor groups arranged in an array form,
    wherein each of the N sensor groups comprises M reconfigurable sensors, and
    each of the M reconfigurable sensors includes an antenna and is operable to detect one type of terahertz wave physical characteristic parameter, and the type of the terahertz wave physical characteristic parameter detected by the reconfigurable sensor is based on a detection configuration, wherein N and M are positive integers greater than 1.

2. The terahertz sensing array according to claim 1, wherein:
    a reconfigurable sensor dij in the N sensor groups comprises a receiver, a detector, and an analog-to-digital convertor, and the reconfigurable sensor dij belongs to one of the N sensor groups;
    the receiver is configured to receive a terahertz radiation wave with a type of physical characteristic parameter and convert the terahertz radiation wave into a terahertz guided wave;
    the detector is configured to convert the terahertz guided wave obtained through conversion by the receiver into a low-frequency signal response or a direct-current signal response; and
    the analog-to-digital convertor is configured to collect the low-frequency signal response or the direct-current signal response obtained through conversion by the detector, to obtain a digital signal response.

3. The terahertz sensing array according to claim 1, wherein a respective reconfigurable sensor in each sensor group is configured to detect only one type of terahertz wave physical characteristic parameter, M reconfigurable sensors in one sensor group are configured to detect K different types of terahertz wave physical characteristic parameters in total, and K is a positive integer greater than 1 and less than M.

4. The terahertz sensing array according to claim 3, wherein the K different types of terahertz wave physical characteristic parameters comprise K different frequency bands of terahertz radiation waves.

5. The terahertz sensing array according to claim 3, wherein the K different types of terahertz physical characteristic parameters comprise K different types of polarization of terahertz radiation waves.

6. The terahertz sensing array according to claim 3, wherein M is equal to K, and each of M reconfigurable sensors in one sensor group is configured to detect a different type of terahertz wave physical characteristic parameter.

7. The terahertz sensing array according to claim 3, wherein when M is greater than K, some reconfigurable sensors among the M reconfigurable sensors in a particular one of the sensor groups are configured to detect different types of terahertz wave physical characteristic parameters, and other reconfigurable sensors among the M reconfigurable sensors in the particular one of the sensor groups are configured to detect a same type of terahertz wave physical characteristic parameter.

8. A terahertz sensing system, comprising:
    a back-end processing system; and
    a terahertz sensing array according to claim 1;
    wherein the back-end processing system is operable to:
        receive a digital signal response that corresponds to a detected type of terahertz wave physical characteristic parameter and that is output by a reconfigurable sensor in the terahertz sensing array, and
        obtain, by performing interpolation based on the received digital signal response output by the reconfigurable sensor, a digital signal response corresponding to a type of terahertz wave physical characteristic parameter not detected by the reconfigurable sensor.

9. The terahertz sensing system according to claim 8, wherein each reconfigurable sensor is configured to detect only one type of terahertz physical characteristic parameter, and is configured such that a digital signal response corresponding to a type of terahertz wave physical characteristic parameter not detected by a reconfigurable sensor is obtained by performing interpolation based on a digital signal response output by a reconfigurable sensor around the reconfigurable sensor.

10. The terahertz sensing system according to claim 9, wherein the terahertz sensing system is configured such that a digital signal response corresponding to an $x^{th}$ type of terahertz wave physical characteristic parameter not detected by a reconfigurable sensor dij is obtained by performing interpolation based on digital signal response output by at least two reconfigurable sensors that are around the reconfigurable sensor dij and that are configured to detect the $x^{th}$ type of terahertz wave physical characteristic parameter, the $x^{th}$ type of terahertz wave physical characteristic parameter is one type of terahertz wave physical characteristic parameter in K−1 types of terahertz wave physical characteristic parameters not detected by the reconfigurable sensor dij, and x is a positive integer greater than 1.

11. The terahertz sensing system according to claim 8, wherein the back-end processing system is further configured to:
assign a color identifier to a digital signal response that is of each reconfigurable sensor and that corresponds to each type of terahertz wave physical characteristic parameter;
separately combine digital signal responses that are of reconfigurable sensors and to which a same color identifier is assigned, to form K monochrome images; and
combine the K monochrome images into a pseudo-color image, wherein there are one-to-one correspondences between the K monochrome images and K types of terahertz wave physical characteristic parameters.

12. A system comprising:
a back-end processing system coupled to a terahertz sensing array, wherein the terahertz sensing array is the terahertz sensing array according to claim 1; and
wherein the back-end processing system is operable to:
receive a digital signal response that corresponds to a detected type of terahertz wave physical characteristic parameter and that is output by a reconfigurable sensor in the terahertz sensing array, and
obtain, by performing interpolation based on the received digital signal response output by the reconfigurable sensor, a digital signal response corresponding to a type of terahertz wave physical characteristic parameter not detected by the reconfigurable sensor.

13. The system according to claim 12, wherein the back-end processing system is further configured to:
assign a color identifier to a digital signal response that is of each reconfigurable sensor and that corresponds to each type of terahertz wave physical characteristic parameter;
separately combine digital signal responses that are of reconfigurable sensors and to which a same color identifier is assigned, to form K monochrome images; and
combine the K monochrome images into a pseudo-color image, wherein there are one-to-one correspondences between the K monochrome images and K types of terahertz wave physical characteristic parameters.

14. The terahertz sensing array according to claim 1, wherein at least one sensor group of the N senor groups comprises a non-reconfigurable sensor, and a detection configuration of the non-reconfigurable sensor is non-reconfigurable.

* * * * *

UNITED STATES PATENT AND TRADEMARK OFFICE
CERTIFICATE OF CORRECTION

PATENT NO. : 12,140,537 B2
APPLICATION NO. : 17/843572
DATED : November 12, 2024
INVENTOR(S) : Oupeng Li and Yinggang Du Page 1 of 1

It is certified that error appears in the above-identified patent and that said Letters Patent is hereby corrected as shown below:

In the Claims

In Column 17, In Line 19 (Approx.), In Claim 10, delete "response" and insert -- responses --.

In Column 18, In Line 34 (Approx.), In Claim 14, delete "senor" and insert -- sensor --.

Signed and Sealed this
Fourth Day of March, 2025

Coke Morgan Stewart
*Acting Director of the United States Patent and Trademark Office*